United States Patent
Yang et al.

(10) Patent No.: US 10,387,089 B2
(45) Date of Patent: Aug. 20, 2019

(54) INFORMATION PROCESSING APPARATUS, CONTROL METHOD THEREOF, AND NON-TRANSITORY COMPUTER READABLE MEDIUM USING AUTHENTICATION PROCESSING

(71) Applicant: CANON KABUSHIKI KAISHA, Tokyo (JP)

(72) Inventors: Guowei Yang, Kawasaki (JP); Mitsuru Konji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/469,915

(22) Filed: Mar. 27, 2017

(65) Prior Publication Data
US 2017/0286028 A1 Oct. 5, 2017

(30) Foreign Application Priority Data
Mar. 30, 2016 (JP) .................................. 2016-069280

(51) Int. Cl.
*G06F 3/12* (2006.01)
*G06F 21/62* (2013.01)
(Continued)

(52) U.S. Cl.
CPC .......... *G06F 3/1238* (2013.01); *G06F 3/1203* (2013.01); *G06F 3/1222* (2013.01); *G06F 3/1236* (2013.01); *G06F 3/1259* (2013.01); *G06F 3/1285* (2013.01); *G06F 3/1292* (2013.01); *G06F 3/1296* (2013.01); *G06F 21/445* (2013.01); *G06F 21/608* (2013.01); *G06F 21/6218* (2013.01); *H04N 1/00204* (2013.01); *H04N 1/00307* (2013.01); *H04N 1/4406* (2013.01); *H04N 1/4413* (2013.01); *H04N 2201/0032* (2013.01);
(Continued)

(58) Field of Classification Search
CPC ................................... H04N 21/43637
USPC ........................................ 358/1.15
See application file for complete search history.

(56) References Cited

U.S. PATENT DOCUMENTS

| | | | |
|---|---|---|---|
| 2014/0104635 A1* | 4/2014 | Nishikawa | ......... H04N 1/00238 358/1.14 |
| 2015/0029541 A1* | 1/2015 | Yun | .................... H04N 1/00493 358/1.15 |

(Continued)

FOREIGN PATENT DOCUMENTS

| | | |
|---|---|---|
| JP | 2007068016 A | 3/2007 |
| JP | 2015-158805 A | 9/2015 |

OTHER PUBLICATIONS

Japanese Office Action issued in corresponding Japanese Application No. 2017171344 dated May 11, 2018.

*Primary Examiner* — Jacky X Zheng
(74) *Attorney, Agent, or Firm* — Venable LLP

(57) ABSTRACT

An information processing apparatus comprises: a communication unit which performs short-range wireless communication with an external apparatus configured to provide a predetermined function; a first determination unit which determines, based on information obtained from the external apparatus by the communication unit, whether to perform authentication processing in order to utilize the predetermined function of the external apparatus; and an authentication unit which performs the authentication processing if the first determination unit determines to perform the authentication processing.

19 Claims, 15 Drawing Sheets

(51) Int. Cl.
*H04N 1/00* (2006.01)
*H04N 1/44* (2006.01)
*G06F 21/44* (2013.01)
*G06F 21/60* (2013.01)

(52) U.S. Cl.
CPC ............... *H04N 2201/0046* (2013.01); *H04N 2201/0072* (2013.01); *H04N 2201/0075* (2013.01); *H04N 2201/0094* (2013.01)

(56) References Cited

U.S. PATENT DOCUMENTS

| | | | |
|---|---|---|---|
| 2015/0339561 A1* | 11/2015 | Takenaka | B41J 29/00 358/1.14 |
| 2016/0255220 A1* | 9/2016 | Oguma | H04N 1/00854 358/1.13 |
| 2016/0286053 A1* | 9/2016 | Akamine | H04N 1/0023 |
| 2016/0337553 A1 | 11/2016 | Sato | |
| 2017/0134609 A1* | 5/2017 | Park | H04N 1/32776 |

* cited by examiner

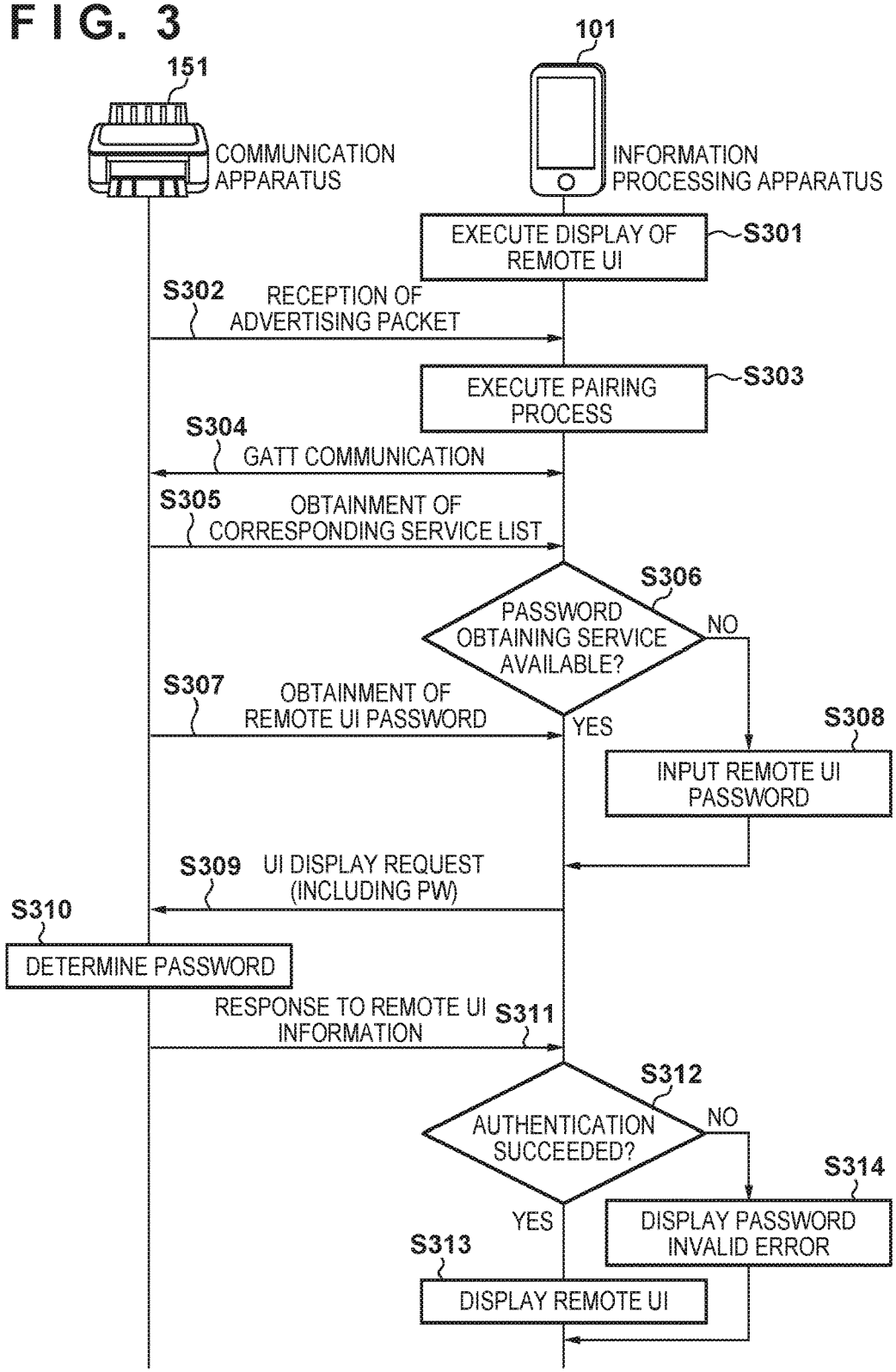

F I G. 5B

503

| AD Structure | | octet | value | description |
|---|---|---|---|---|
| AD Structure1 | Length | 1 | 0x02 | |
| | AD type | 1 | 0x01 | flags |
| | Data | 1 | 0x06 | LE General Discoverable Mode & BR/EDR Not Supported |
| AD Structure2 | Length | 1 | 0x07 | |
| | AD type | 1 | 0xFF | DATA INDICATES DATA UNIQUE TO COMMUNICATION APPARATUS |
| | Data | 4 | 0xAABBCCDD | COMMUNICATION APPARATUS SPECIFIC INFORMATION |
| | | 2 | ARBITRARILY | FUNCTION AND STATE OF COMMUNICATION APPARATUS |
| AD Structure3 | Length | 1 | 0x09 | |
| | AD type | 1 | 0x09 | DATA INDICATES NAME OF COMMUNICATION APPARATUS |
| | Data | 8 | PrinterA | NAME OF COMMUNICATION APPARATUS |

504

| octet | value | description |
|---|---|---|
| 1 | 1 | PRESENCE/ABSENCE OF PRINT FUNCTION |
| 2 | 0 | COMMUNICATION APPARATUS IS IN ERROR STATE |
| 3 | 0 | ... |
| : | : | : |
| 15 | 0 | ... |
| 16 | 0 | PAGE NUMBER |

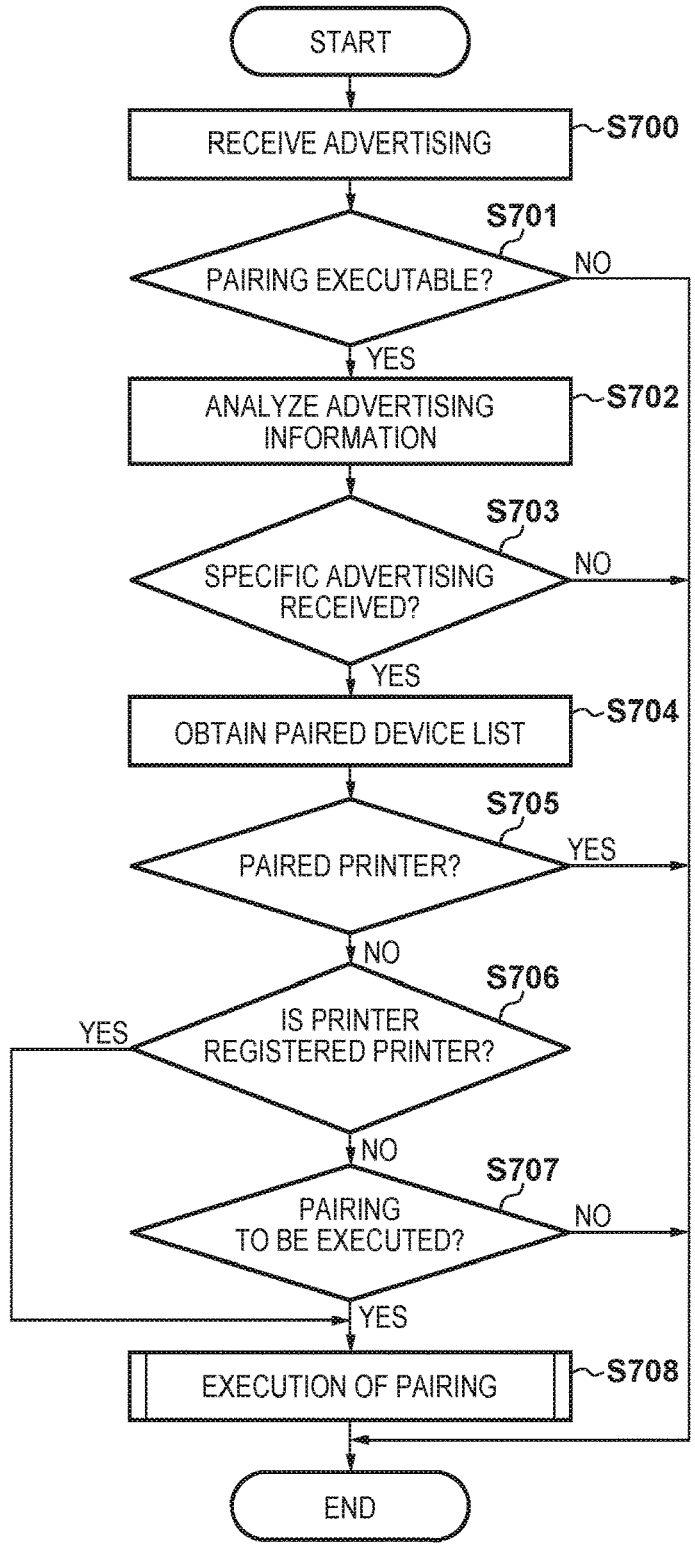

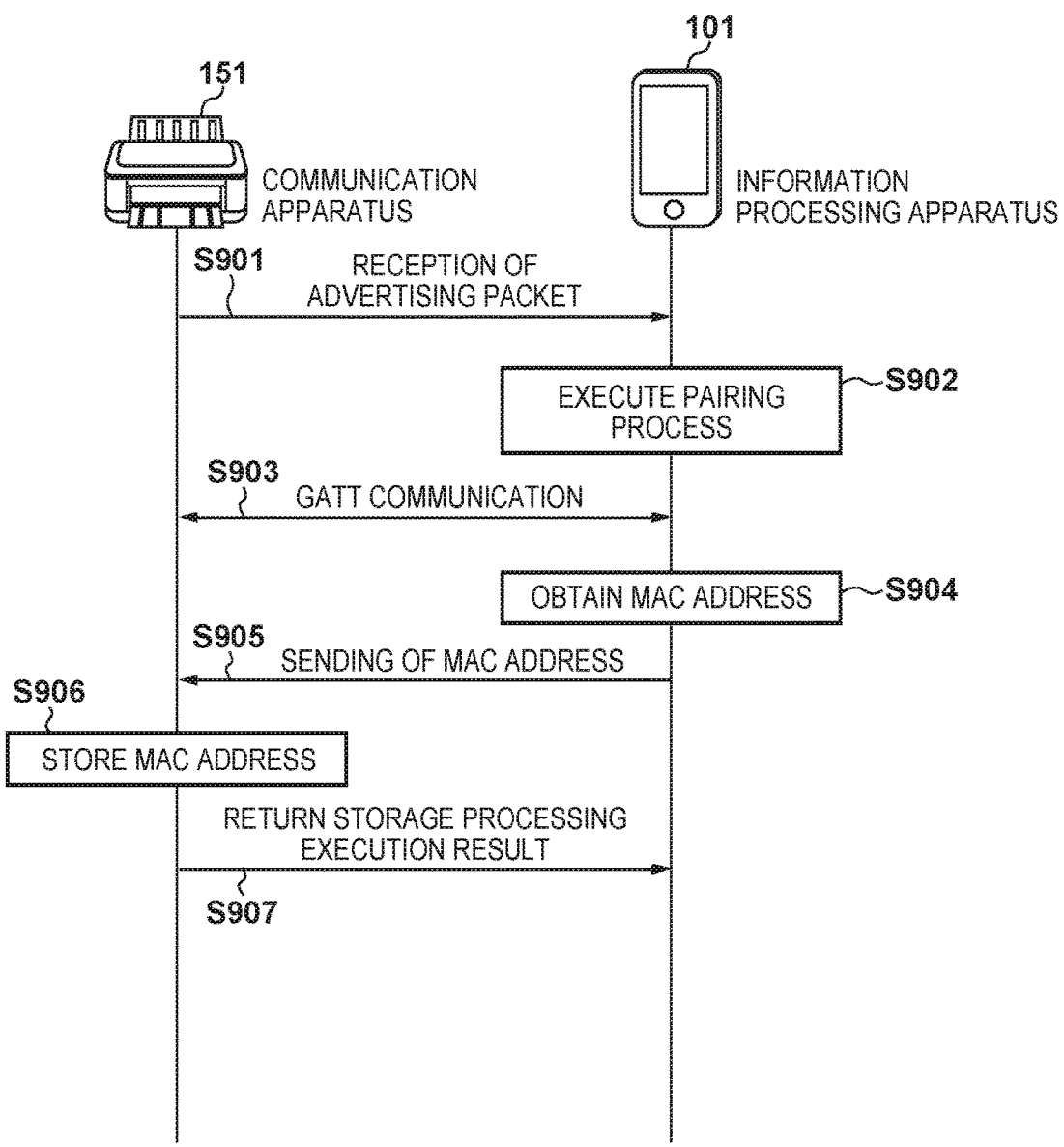

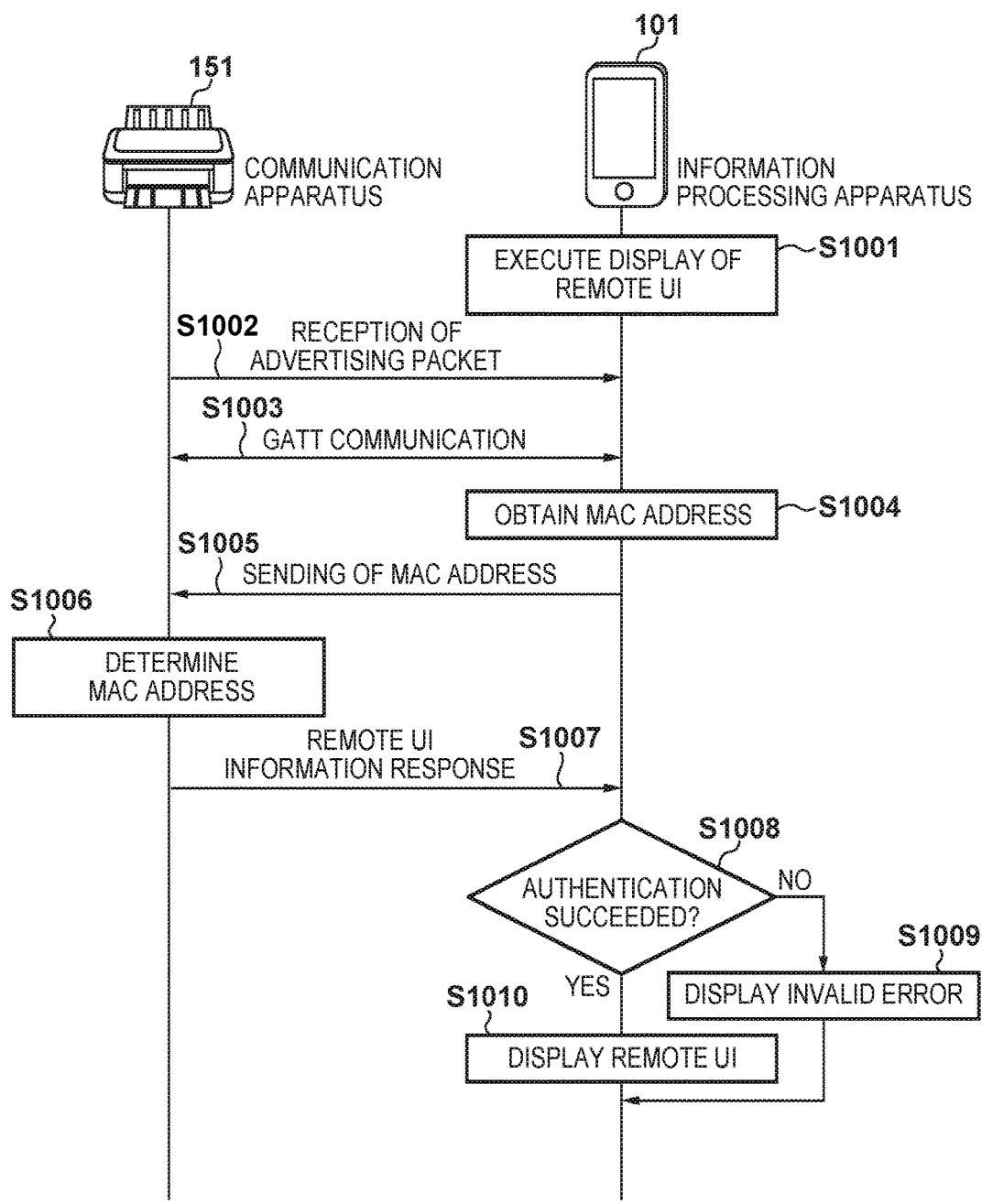

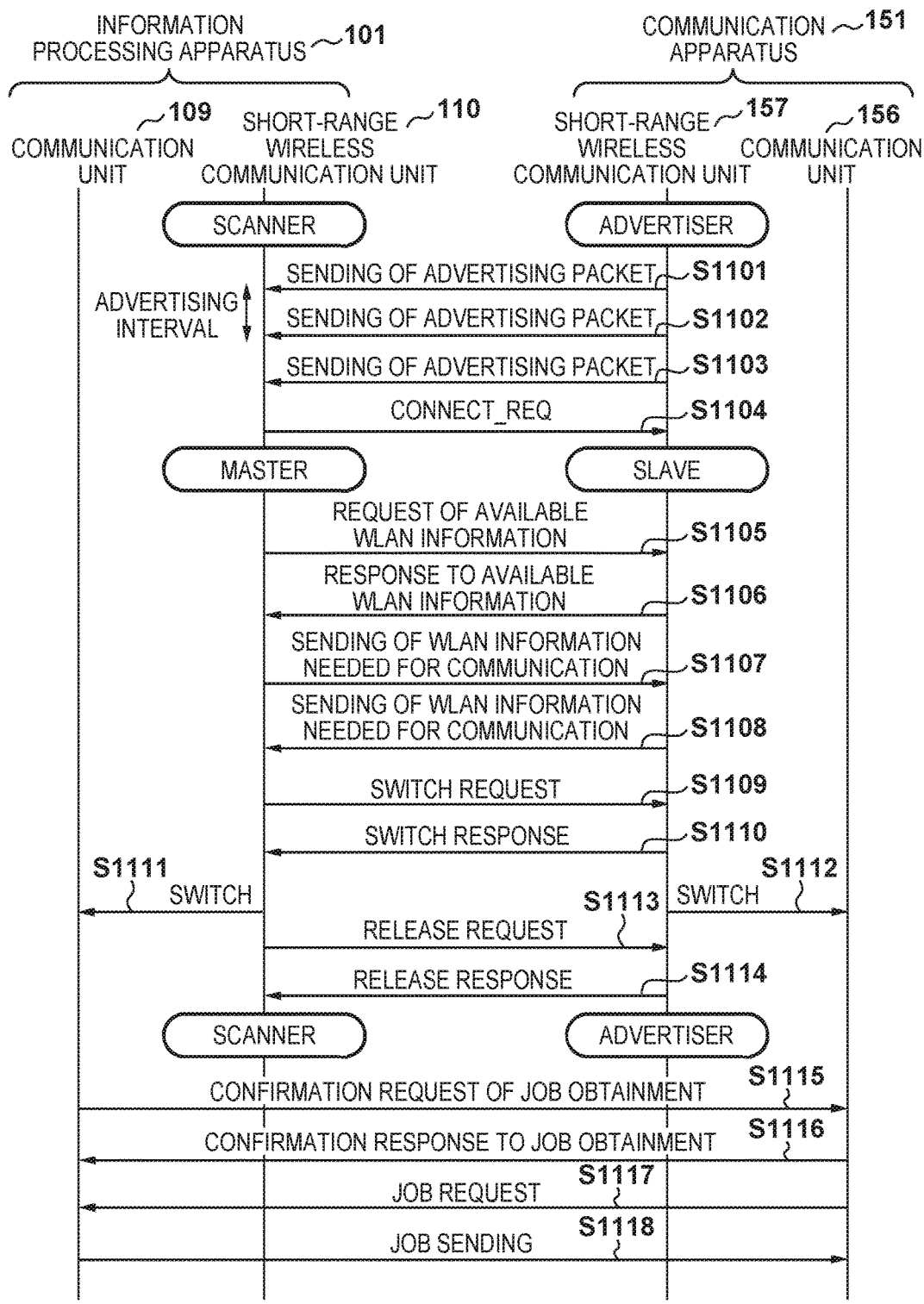

INFORMATION PROCESSING APPARATUS, CONTROL METHOD THEREOF, AND NON-TRANSITORY COMPUTER READABLE MEDIUM USING AUTHENTICATION PROCESSING

BACKGROUND OF THE INVENTION

Field of the Invention

The present invention relates to an information processing apparatus, a control method thereof, and a non-transitory computer readable medium.

Description of the Related Art

A remote UI technique is known as a method of managing a printing apparatus remotely from an information processing apparatus such as a PC or a mobile terminal. For example, Japanese Patent Laid-Open No. 2015-158805 describes a technique of using a remote UI in order to utilize the function of an MFP (Multi-Function Peripheral) serving as a printing apparatus and a technique of executing authentication processing in order to display the remote UI.

When utilizing the function of an external apparatus (the remote UI in the above-described case) which requires the authentication processing from the information processing apparatus as described above, a further improvement in operability thereof is desired. More specifically, if the authentication processing is performed when utilizing the remote UI, a user needs to input authentication information (for example, a password) each time.

To cope with this, the present invention improves convenience when utilizing the function of the external apparatus which requires the authentication processing from the information processing apparatus.

SUMMARY OF THE INVENTION

According to one aspect of the present invention, there is provided an information processing apparatus comprising: a communication unit configured to perform short-range wireless communication with an external apparatus configured to provide a predetermined function; a first determination unit configured to determine, based on information obtained from the external apparatus by the communication unit, whether to perform authentication processing in order to utilize the predetermined function of the external apparatus; and an authentication unit configured to perform the authentication processing if the first determination unit determines to perform the authentication processing.

According to another aspect of the present invention, there is provided a method of controlling an information processing apparatus which includes a communication unit configured to perform short-range wireless communication with an external apparatus configured to provide a predetermined function, the method comprising: determining, based on information obtained from the external apparatus by the communication unit, whether to perform authentication processing in order to utilize the predetermined function of the external apparatus; and performing the authentication processing if the determining to perform the authentication processing.

According to another aspect of the present invention, there is provided a non-transitory computer readable medium storing a program to cause a computer including a communication unit configured to perform short-range wireless communication with an external apparatus configured to provide a predetermined function to function as: a first determination unit configured to determine, based on information obtained from the external apparatus by the communication unit, whether to perform authentication processing in order to utilize the predetermined function of the external apparatus; and an authentication unit configured to perform the authentication processing if the first determination unit determines to perform the authentication processing.

The present invention can improve convenience when utilizing the function of an external apparatus which requires authentication processing from an information processing apparatus.

Further features of the present invention will become apparent from the following description of exemplary embodiments (with reference to the attached drawings).

BRIEF DESCRIPTION OF THE DRAWINGS

FIG. 3 is a sequence chart showing a processing sequence according to the first embodiment;

FIGS. 5A and 5B are tables for explaining an example of the data structure of advertising information according to the present invention;

FIG. 7 is a flowchart showing a pairing process according to the present invention;

FIG. 9 is a sequence chart showing the processing sequence of storing of a MAC address according to the second embodiment;

FIG. 10 is a sequence chart showing a processing sequence according to the second embodiment;

FIG. 11 is a sequence chart showing the processing sequence of handover between apparatuses.

DESCRIPTION OF THE EMBODIMENTS

Preferred embodiments of the present invention will exemplarily be described below with reference to the accompanying drawings. As for the present invention, however, it should be understood that, based on general knowledge of those who are skilled in the art, matters obtained by appropriately changing and improving the embodiments to be described below without departing from the scope thereof also fall within the scope of the present invention.

First Embodiment

[System Arrangement]

An example of the arrangements of an information processing apparatus and a communication apparatus included in a communication system according to this embodiment will be described. In this embodiment, a smartphone will be exemplified as the information processing apparatus. However, the information processing apparatus is not limited to this, but may be another apparatus, such as a mobile terminal, a notebook PC, a tablet terminal, a PDA (Personal Digital Assistant), or a digital camera, capable of short-range wireless communication with a communication terminal. Further, in this embodiment, a printer is exemplified as a communication apparatus. However, the communication apparatus is not limited to this, but may be another apparatus as long as it is capable of short-range wireless communication with the information processing apparatus. For example, if the printer serves as the communication apparatus, the present invention is applicable to an inkjet printer, a full-color laser beam printer, a monochrome printer, or the like. The present invention is also applicable not only to the printer but also to a copying machine, a facsimile apparatus, the mobile terminal, the smartphone, the notebook PC, the tablet terminal, the PDA, the digital camera, a music reproduction device, a TV set, or the like. In addition, the present invention is also applicable to an MFP (Multi-Function Peripheral) having a plurality of functions such as a copy function, a FAX function, a print function, and the like.

First, the example of the arrangements of the information processing apparatus and the communication apparatus according to this embodiment will be described with reference to FIG. 1. Each of the information processing apparatus, the communication apparatus, and an access point is shown here. However, the present invention is not limited to this.

Figure 1:
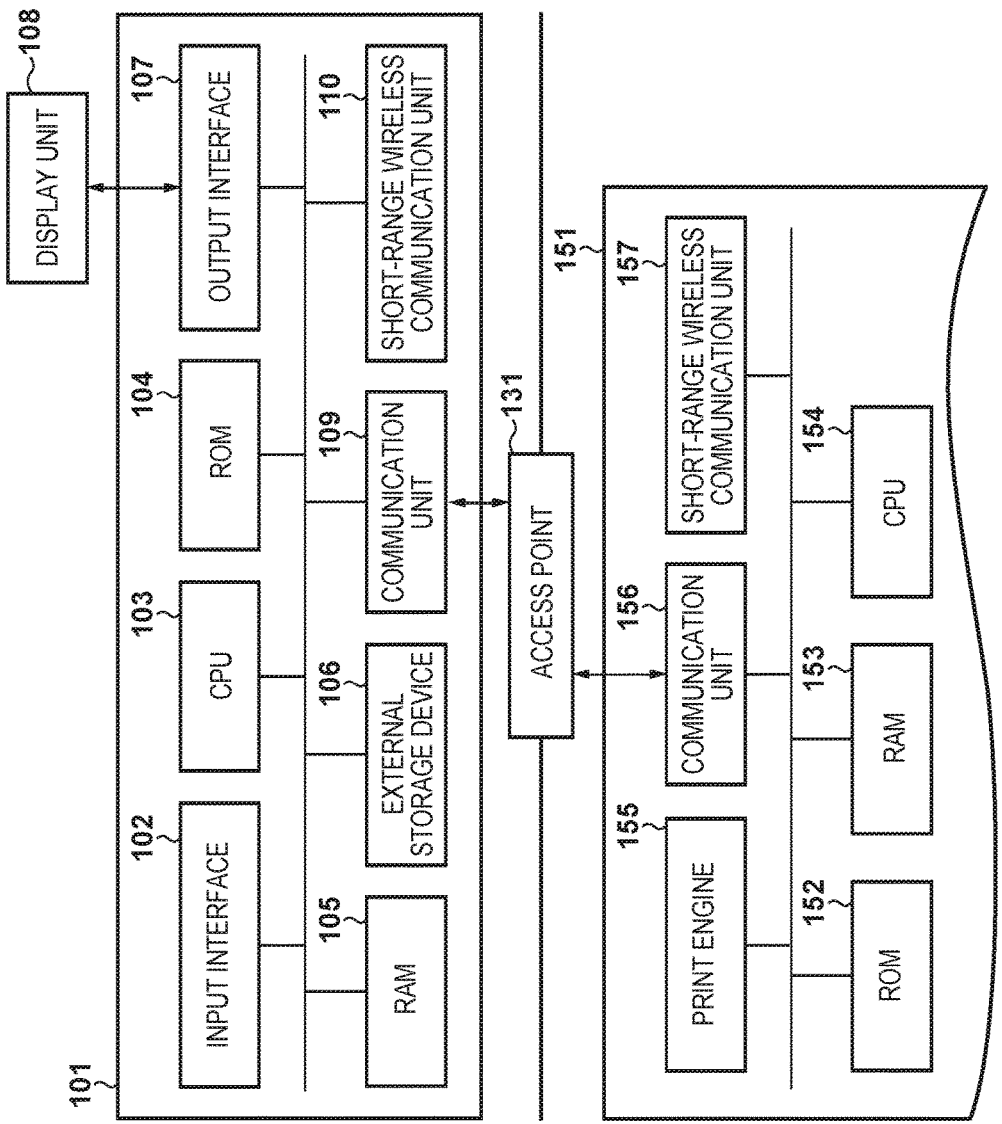
FIG. 1 is a block diagram showing an example of the arrangement of a communication system according to the present invention.

In FIG. 1, an information processing apparatus 101 is configured to include an input interface 102, a CPU 103, a ROM 104, a RAM 105, an external storage device 106, an output interface 107, a display unit 108, a communication unit 109, and a short-range wireless communication unit 110. Note that they are connected to each other via a system bus.

The input interface 102 is an interface which receives an instruction from a user via an operation unit (not shown) such as a physical keyboard or a mouse. The CPU 103 is a system control unit and controls the entire information processing apparatus 101 by executing programs or activating hardware. The ROM 104 is a non-volatile storage area and stores permanent data such as various control programs to be executed by the CPU 103, data tables, and an embedded operating system (OS) program. In this embodiment, for example, software execution control of scheduling, task switch, interrupt processing, and the like is performed by each control program stored in the ROM 104 under the management of the embedded OS stored in the ROM 104.

A RAM 105 is an SRAM (Static Random Access Memory), a DRAM (Dynamic Random Access Memory), or the like. Note that in this embodiment, the RAM 105 holds data by a primary battery (not shown) for data backup. In this case, the RAM 105 can store important data such as program control variables without volatilizing them. The RAM 105 is also provided with a memory area for storing setting information, management data, and the like of the information processing apparatus 101. The RAM 105 is also used as the main memory and work memory of the CPU 103. The external storage device 106 stores an application which provides a print execution function (to be referred to as a print application), a program which generates a print job interpretable by a communication apparatus 151, and the like. The external storage device 106 also stores programs which send/receive various kinds of information to/from the communication apparatus 151 connected via the communication unit 109 and various kinds of information used by these programs.

The output interface 107 is an interface for the display unit 108 to perform control for displaying data and notifying about the state of the information processing apparatus 101. Note that the display unit 108 and the above-described operation unit may at least partially be integral with each other, and they may be, for example, a touch panel where output of a screen and reception of an operation from the user are performed on the same screen. The display unit 108 is formed by an LED (Light Emitting Diode), an LCD (Liquid Crystal Display), and the like, and displays the data and notifies about the state of the information processing apparatus 101. An input from the user may be received via the display unit 108 by installing a soft keyboard (not shown) having keys such as numerical value input keys, mode setting keys, an enter key, a cancel key, and a power key on the display unit 108.

The communication unit 109 is connected to an external apparatus such as the communication apparatus 151 to execute data communication. For example, the communication unit 109 can be connected to an access point (not shown) by a device in the communication apparatus 151 or externally connected to the communication apparatus 151. The information processing apparatus 101 and the communication apparatus 151 can communicate with each other by connecting the communication unit 109 and the access point in the communication apparatus 151. Note that the communication unit 109 may directly communicate with the communication apparatus 151 in wireless communication or may communicate via an external access point (for example, an access point 131) that exists outside the information processing apparatus 101 and the communication apparatus 151. As a wireless communication system, Wi-Fi (Wireless Fidelity)®, Bluetooth®, or the like can be given as an example. As the access point 131, a device such as a wireless LAN router can be given as an example. Note that in this embodiment, a method of connecting the information processing apparatus 101 and the communication apparatus 151 directly without intervening the external access point will be referred to as a direct connect method. A method of connecting the information processing apparatus 101 and the communication apparatus 151 via the external access point will be referred to as an infrastructure connection method.

The short-range wireless communication unit 110 is configured to execute data communication by short-range wireless connection with the external apparatus such as the communication apparatus 151 and performs communication by a communication system different from that of the communication unit 109. For example, the short-range wireless communication unit 110 can be connected to a short-range wireless communication unit 157 in the communication apparatus 151 in a short range. Note that in this embodiment, a description will be given assuming that Bluetooth Low Energy (BLE) is used as the communication system of the short-range wireless communication unit 110. That is, the short-range wireless communication unit 110 includes a BLE unit. The BLE unit includes a microcomputer serving as a microprocessor which performs wireless communication processing and a wireless communication circuit which sends/receives data by wireless communication. The microcomputer incorporates the RAM and a flash memory. Note that in addition to BLE, for example, NFC (Near Field Communication) or Wi-Fi Aware may be used as the communication system of the short-range wireless communication unit 110. A range at which short-range wireless communication is possible changes in accordance with the communication system. However, the description will be given here assuming that the information processing apparatus 101 and the communication apparatus 151 are positioned in that range. Further, the description will be given assuming that in communication between the information processing apparatus 101 and the communication apparatus 151, communication performance (a communication speed or a data amount) between the communication unit 109 and a communication unit 156 is higher than that between the short-range wireless communication unit 110 and the short-range wireless communication unit 157.

The communication apparatus 151 is configured to include a ROM 152, a RAM 153, a CPU 154, a print engine 155, the communication unit 156, and the short-range wireless communication unit 157.

The communication unit 156 includes, as an access point inside the communication apparatus 151, an access point for connecting to an external apparatus such as the information processing apparatus 101. Note that the communication unit 156 may directly communicate with the information processing apparatus 101 in wireless communication or may communicate via the access point 131 serving as the external access point. As the wireless communication system, Wi-Fi®, Bluetooth®, or the like can be given as the example. Further, the communication unit 156 may include hardware which functions as an access point or may operate as an access point by software for functioning it as the access point. The short-range wireless communication unit 157 is configured to wirelessly connect to an apparatus such as the information processing apparatus 101 in a short range. In this embodiment, the description will be given assuming that BLE is used as the communication system of the short-range wireless communication unit 157.

A RAM 153 is formed by the SRAM, the DRAM, or the like. Note that the RAM 153 may hold data by a primary battery (not shown) for data backup. In this case, the RAM 153 can store important data such as program control variables without volatilizing them. The RAM 153 is also provided with a memory area for storing setting information, management data, and the like of the communication apparatus 151. The RAM 153 is also used as the main memory and work memory of the CPU 154, and stores various kinds of information and a reception buffer for temporarily storing a print job received from the information processing apparatus 101 or the like. The ROM 152 is a non-volatile storage area and stores permanent data such as control programs to be executed by the CPU 154, data tables, and an OS program. In this embodiment, software execution control of scheduling, task switch, interrupt processing, and the like is performed by each control program stored in the ROM 152 under the management of the embedded OS stored in the ROM 152.

The CPU 154 is a system control unit and controls the entire communication apparatus 151 by executing programs or activating hardware. Based on the information stored in the RAM 153 and the print job received from the external apparatus such as the information processing apparatus 101, the print engine 155 forms an image on a printing medium such as paper by using a printing material such as ink and outputs a printing result. At this time, a print job sent from the information processing apparatus 101 or the like has a large sending data amount and is required for high-speed communication. Therefore, in this embodiment, the print job is received via the communication unit 156 capable of communicating at higher speed than the short-range wireless communication unit 157.

Note that an optional device such as an external HDD or an SD card may be attached to the communication apparatus 151, and information stored in the communication apparatus 151 may be stored in the memory serving as the optional device. Further, process sharing between the information processing apparatus 101 and the communication apparatus 151 has been described above as an example. However, sharing is not particularly limited to this sharing form but may be another form.

[Short-Range Wireless Communication]

A process of sending advertising information (advertising packet) in a BLE standard and receiving a start request of GATT (Generic Attribute Profile) communication will be described here. In this embodiment, the information processing apparatus 101 operates as a master apparatus, and the communication apparatus 151 operates as a slave device. Note that this division of roles is merely an example, and another form may be used. In this embodiment, the communication apparatus 151 operates as the slave device, and thus the short-range wireless communication unit 157 performs the process of sending the advertising information and receiving the start request of GATT communication.

Figure 2A:
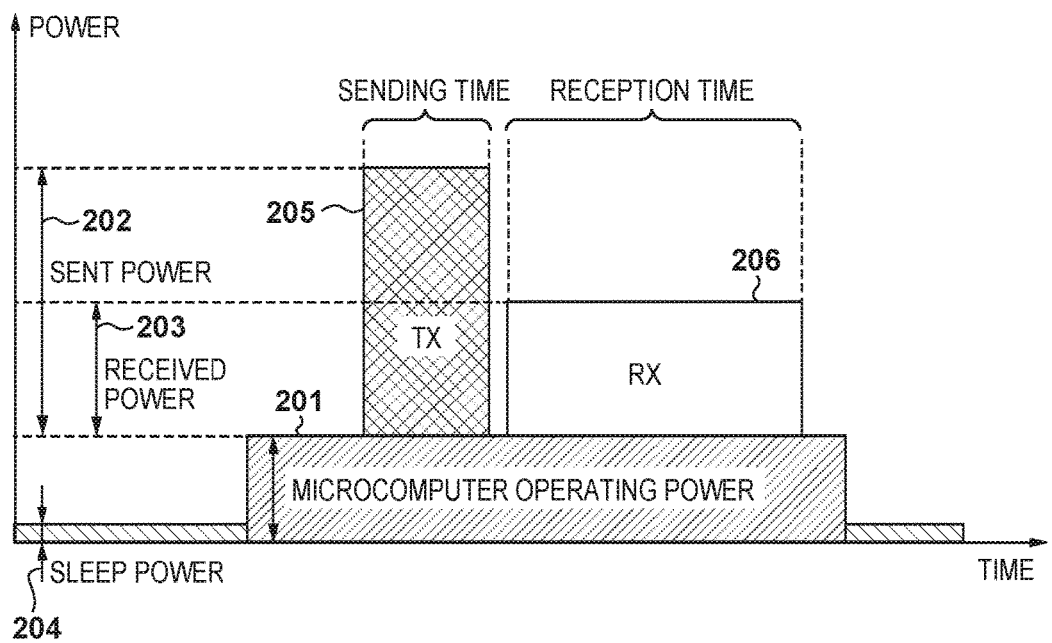
FIGS. 2A and 2B are graphs for explaining advertising in BLE communication according to the present invention.
Figure 2B:
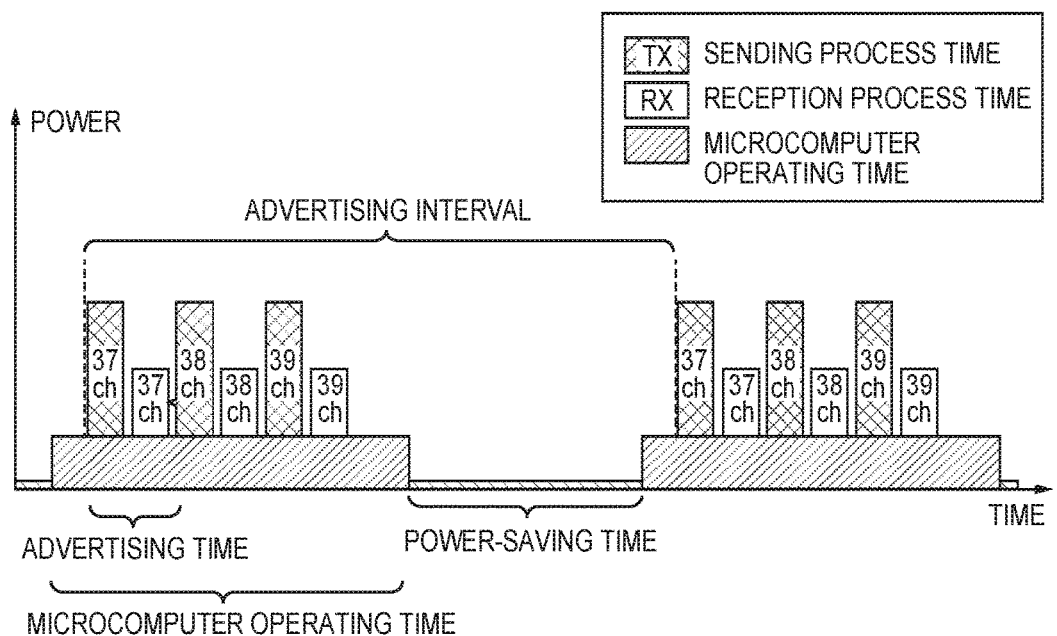

In BLE communication, the short-range wireless communication unit 157 performs communication by dividing a 2.4-GHz frequency band into 40 channels (0th to 39th channels). Out of these channels, the short-range wireless communication unit 157 utilizes the 37th to 39th three channels to send the advertising information and receive the start request of GATT communication, and utilizes the 0th to 36th 37 channels for data communication after BLE connection. In FIGS. 2A and 2B, the ordinate indicates power consumption of the short-range wireless communication unit 157, and the abscissa indicates a time. Power saving can be given as an advantage of BLE, and thus power consumption when the advertising information is sent by utilizing one channel in the communication apparatus 151 is shown here on the process basis.

In FIG. 2A, Tx 205 indicates total power consumption in a sending process serving as a process of broadcasting the advertising information. Rx 206 indicates total power consumption in a reception process serving as a process of enabling a receiver for receiving the start request of GATT communication. Sent power 202 indicates instantaneous power consumption by the sending process. Received power 203 indicates instantaneous power consumption by the reception process.

Microcomputer operating power 201 indicates instantaneous power consumption when a microcomputer (not shown) in the short-range wireless communication unit 157 operates. Note that the reason that the microcomputer also operates before and after, and between the Tx 205 and the Rx 206 is that the microcomputer needs to be activated in advance in order to execute or stop the sending process and the reception process. If the plurality of channels send the advertising information, power consumption (sent power 202) increases by the number of channels sending the advertising information. While the microcomputer does not operate, and the short-range wireless communication unit 157 is in a power-saving state, sleep power 204 becomes instantaneous power consumption of the short-range wireless communication unit 157. As described above, the short-range wireless communication unit 157 waits for the start request of GATT communication to be sent from the information processing apparatus 101 by performing the reception process for a predetermined time by using a predetermined channel after performing the sending process by using the predetermined channel.

As shown in FIG. 2B, the short-range wireless communication unit 157 stops the operation of the microcomputer and is set in the power-saving state for a predetermined time after repeating the sending process and the reception process of the advertising information three times for each channel. The combination of the sending process and the reception process of the advertising information by a predetermined channel will be referred to as advertising hereinafter. A time related to this pair of sending and reception will be referred to as an advertising time. Further, a time interval when predetermined channels (the 37th to 39th three channels here) send the advertising information will be referred to as an advertising interval. That is, the time interval from when a certain channel sends the advertising information till when the same channel sends the advertising information next is an advertising time interval. Note that the number of advertising operations repeated until the power-saving state is set after performing the first advertising can be changed arbitrarily as long as it is three or less. In FIG. 2B, the channels each performing the sending process and the reception process are shown in a sending process time and a reception process time.

[Processing Sequence]

FIG. 3 is a sequence for accessing, from the information processing apparatus 101, a function with an access restriction supported by the communication apparatus 151. In this embodiment, a function of the remote UI (Remote User Interface) of the printer is given as an example of the function with the access restriction supported by the communication apparatus 151 in FIG. 3. A remote UI function is software (function) for managing the communication apparatus 151 by using a Web browser (not shown) of the information processing apparatus 101 and is a service capable of managing the communication apparatus 151 remotely from the information processing apparatus 101. The remote UI has, for example, a function of changing wireless communication information of the printer. That is, if the information processing apparatus changes the wireless communication information of the printer by using the remote UI, it may become impossible to communicate with an apparatus that can be communicated from the printer currently. It is therefore necessary to impose the access restriction such that setting cannot be changed from an arbitrary apparatus. The user needs to obtain a password for displaying the remote UI from the communication apparatus 151 in order to user the service of the remote UI and input an appropriate password on the password input screen of the remote UI displayed in the information processing apparatus.

Note that in this embodiment, the remote UI is given as an example of the function with the access restriction. However, the present invention is not limited to this, but is also applicable to, for example, a function of authenticating whether to print or not in a user name.

The processing sequence according to this embodiment will be described with reference to FIG. 3. Note that each process according to the processing sequence below is based on a hardware arrangement shown in FIG. 1, and is implemented by reading out and executing the programs stored in the ROMs and the like by the CPUs included in the information processing apparatus 101 and the communication apparatus 151, respectively. Furthermore, communication between the apparatuses is performed via the short-range wireless communication unit of each apparatus.

If the user inputs an instruction for displaying the remote UI via a print application screen, in step S301, the information processing apparatus 101 makes preparations for receiving the advertising information of BLE from the communication apparatus 151. The preparations for receiving the advertising information of BLE can also be called a search for the advertising information. The communication apparatus 151 periodically transmits the advertising information of BLE.

In step S302, the information processing apparatus 101 receives the advertising information transmitted from the communication apparatus 151. Note that a distance at which reception of the advertising information of BLE is possible is limited to a predetermined range, and thus the user carrying the information processing apparatus 101 needs to approach the communication apparatus 151 to fall within that range when receiving the advertising information of BLE.

Upon receiving the advertising information, the information processing apparatus 101 executes a pairing process in step S303. Note that the pairing process will be described later with reference to FIGS. 4A and 4B, and 7. Communication safety is ensured by pairing the information processing apparatus 101 and the communication apparatus 151 in step S303. Note that step S303 may be omitted if a communication apparatus that sends the advertising information has already been paired as a result of analyzing the advertising information, which will be described later with reference to FIG. 7. In contrast, if the instruction for displaying the remote UI is input, the pairing process may be executed each time.

In order to perform two-way communication, in step S304, the information processing apparatus 101 requests GATT (Generic Attribute Profile) communication in the BLE standard, and GATT communication is started from then on. Note that the arrangement of a profile used for GATT communication is not particularly limited, and thus a description thereof will be omitted here.

In step S305, the information processing apparatus 101 obtains, by GATT communication, a service list supported by the communication apparatus 151. Note that service list information can also be obtained by Wi-Fi communication in addition to the process in step S305. In order to achieve this, however, the Wi-Fi setting of the information processing apparatus 101 needs to be changed. In order to connect to Wi-Fi on which the access restriction is imposed, the password of Wi-Fi is additionally needed. In contrast, there is a merit in that it is possible to perform communication without having to change a connection destination in BLE, and thus the service list information is sent/received by using BLE here.

In step S306, based on the obtained service list information, the information processing apparatus 101 determines whether the communication apparatus 151 has a password obtaining service of the remote UI. The password obtaining service here is a service of providing a password (authentication information) when utilizing a function (the remote UI here) provided by the communication apparatus for the paired information processing apparatus. Note that if pairing is not performed properly between the information processing apparatus and the communication apparatus, GATT communication itself is rejected, providing no password. If there is no password obtaining service (NO in step S306), the process advances to step S308. If there is the password obtaining service (YES in step S306), the process advances to step S307.

If making a password obtaining request by GATT communication, the information processing apparatus 101 obtains the password of the remote UI from the communication apparatus 151 in step S307. Subsequently, the process advances to step S309.

If the communication apparatus 151 does not provide the password obtaining service, the password of the remote UI needs to be input from the user. Therefore, in step S308, the information processing apparatus 101 waits until a password input screen (not shown) is displayed, and input is performed. If the user inputs the password, the process advances to step S309. On the other hand, if the user does not input the password, a process of displaying the remote UI is canceled.

In step S309, the information processing apparatus 101 sends a request to display the remote UI to the communication apparatus 151. The request here is sent including the password obtained from the communication apparatus 151 in step S307 or the password input from the user in step S308.

In step S310, the communication apparatus 151 determines whether the password included in the request received from the information processing apparatus 101 is valid.

In step S311, the communication apparatus 151 sends a determination result in step S310 to the information processing apparatus 101 as a response to the request to display the remote UI. As the response here, a response that access of the remote UI is permitted as authentication success if the password is valid, and an error (authentication failure) value is returned if the password is invalid. Note that if permitting the access, the communication apparatus 151 may also send information regarding the remote UI.

In step S312, the information processing apparatus 101 confirms the contents of the response sent from the communication apparatus 151 and determines whether the response that the access is permitted is obtained. If the access is permitted (YES in step S312), the process advances to step S313. If the error is returned (NO in step S312), the process advances to step S314.

In step S314, the information processing apparatus 101 presents the error that the password is invalid (authentication failure) to the user via the Web browser or the like and waits until the next process arrives.

Figure 12A:
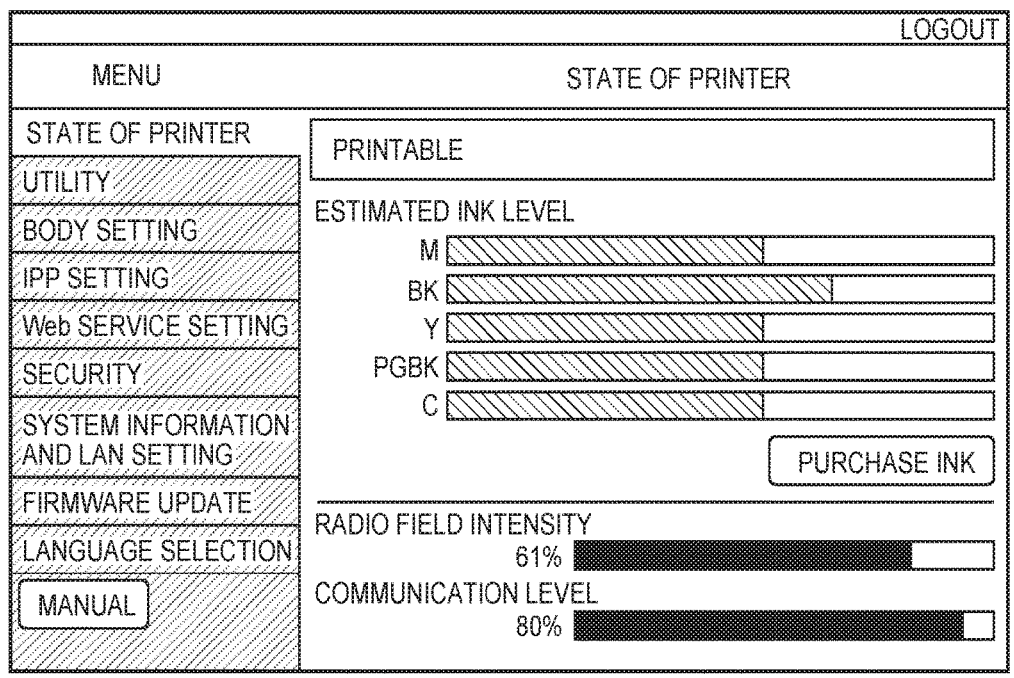
FIGS. 12A and 12B are views showing an example of the arrangement of a remote UI.
Figure 12B:
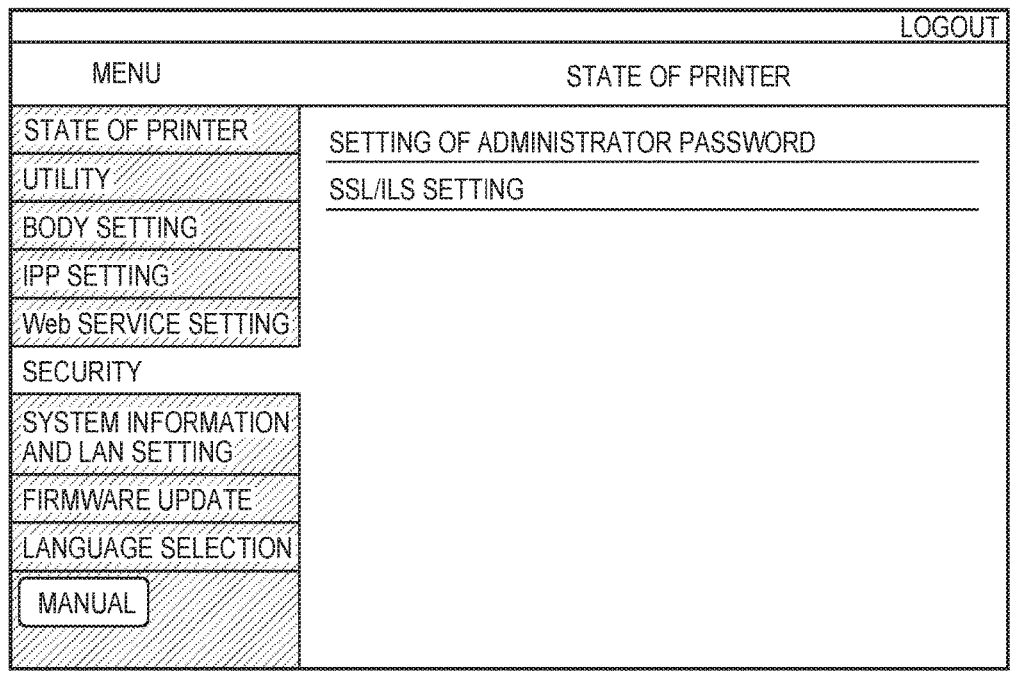

In step S313, the information processing apparatus 101 displays the remote UI. Note that FIGS. 12A and 12B show the screen arrangement of the remote UI. In the remote UI shown in FIGS. 12A and 12B, a screen for confirming various kinds of information regarding the printer serving as the communication apparatus 151 is displayed. FIG. 12A shows, for example, the state (the ink level, radio field intensity, and the communication level) of the printer. FIG. 12B shows information regarding security of the printer.

As described above, in this embodiment, it is confirmed whether the communication apparatus 151 whose pairing has been completed provides a password obtaining function when accessing the function of the communication apparatus 151 on which the access restriction is imposed. Then, if the communication apparatus 151 provides the password obtaining function, it is possible, by obtaining the password from the communication apparatus 151, to use the function with the access restriction smoothly without the user inputting the password of the function with the access restriction. There is also a case in which the information processing apparatus 101 holds the password of the function (for example, the remote UI) with the access restriction before the pairing process is executed. In this case, if the user gives an instruction to execute the remote UI via the print application, the information processing apparatus 101 executes the pairing process to be described later by using FIG. 7 and the like. Then, the information processing apparatus 101 sends the held password to the communication apparatus 151 in response to pairing success. This automatically displays the remote UI in the information processing apparatus 101. That is, this embodiment can improve user operability.

If it is obvious that the communication apparatus 151 whose pairing has been completed provides the password obtaining function, the service list of the communication apparatus 151 need not be obtained. Therefore, the process in steps S305 and S306 may be omitted. In this embodiment, the password can be obtained by the password obtaining function, and the user of the information processing apparatus 101 need not input the password, eliminating the need for step S308.

With the above-described process, it is possible to improve convenience related to utilization of the function of an apparatus which requires authentication processing without displaying an unnecessary confirmation screen or authentication screen when utilizing that function.

(Pairing Process)

The pairing process in step S303 will now be described in detail. In this embodiment, the pairing process by PIN code authentication is executed between the information processing apparatus 101 and the communication apparatus 151 before the aforementioned GATT communication is started. If the information processing apparatus 101 requests the communication apparatus 151 for GATT communication (if making a connection request) in a state in which pairing by PIN code authentication is not executed, the communication apparatus 151 is configured not to permit GATT communication. This configuration can prevent the unpaired information processing apparatus from accidentally obtaining information held by the communication apparatus. PIN code authentication is an authentication method of giving permission only when a predetermined character matches between both the information processing apparatus 101 and the communication apparatus 151 in order to limit information sending/reception only to a specific user (specific information processing apparatus).

The pairing process will be described in detail. First, the information processing apparatus 101 activates the print application according to a user instruction and starts search for the advertising information if an initial screen (home screen FIG. 6B)) displayed by the print application is displayed in the display unit 108. Note that search for the advertising information may be started at another timing. Then, upon receiving the advertising information sent from the communication apparatus 151 in a state in which pairing with the communication apparatus 151 is not completed, the information processing apparatus 101 displays a screen (not shown) for prompting the user to pairing in the display unit 108. Then, the information processing apparatus 101 sends a pairing request to the communication apparatus 151 if instructed to execute pairing by the user.

Figure 4A:
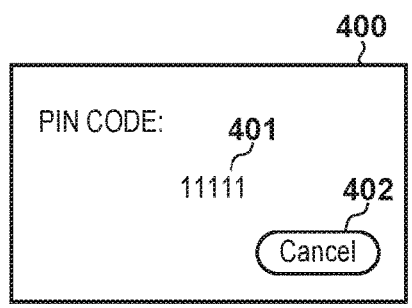
FIGS. 4A and 4B are views for explaining pairing according to the first embodiment.

Upon receiving the pairing request from the information processing apparatus 101, the communication apparatus 151 starts the pairing process. Upon receiving the pairing request, the communication apparatus 151 displays a PIN code display screen 400 as shown in FIG. 4A in a display unit (not shown) of the communication apparatus 151. A PIN code 401 is displayed on the PIN code display screen 400. As the value of this PIN code 401, a value is issued which is not associated with an information processing apparatus different from the information processing apparatus that has made the pairing request. If a Cancel button 402 is selected, the communication apparatus 151 cancels the pairing process. At this time, the issued PIN code may be discarded or may be reissued and used when pairing with another information processing apparatus is performed. Further, an expiration date may be set for the issued PIN code. Note that a method for the number of digits or the like of the PIN code is not limited to an example shown in FIG. 4A, but may be another method.

Figure 4B:
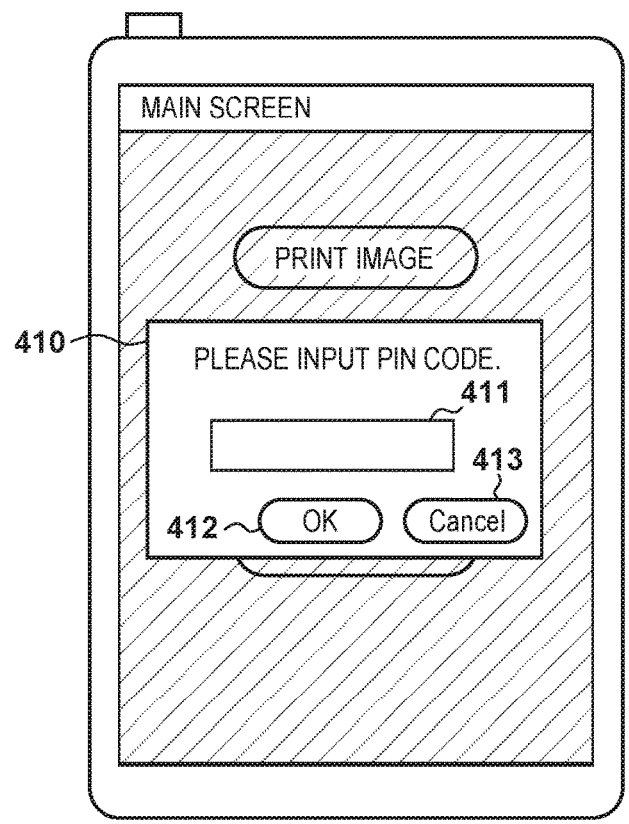

If sending the pairing request to the communication apparatus 151 as described above, the information processing apparatus 101 displays, in the display unit 108, a PIN code input screen 410 as shown in FIG. 4B. The user inputs a PIN code ("1111" in the example of FIG. 4A) issued by the communication apparatus 151 in a PIN code input area 411 of the PIN code input screen 410 and selects an OK button 412. Consequently, the information processing apparatus 101 receives the PIN code. If a Cancel button 413 is selected, the information processing apparatus 101 cancels the pairing process. If the information processing apparatus 101 receives the PIN code or cancels the pairing process, the PIN code display screen 400 of the communication apparatus 151 is hidden and changed to an original screen. Note that if the information processing apparatus 101 receives the PIN code, and the OK button 412 is pressed, the information processing apparatus 101 sends information including the PIN code input in the PIN code input area 411 to the communication apparatus 151.

The communication apparatus 151 determines whether the PIN code included in the received information matches the PIN code 401 displayed on the PIN code display screen 400. If the communication apparatus 151 determines the match as a result of the determination, the information processing apparatus 101 is permitted pairing. More specifically, the communication apparatus 151 creates a link key created by a predetermined method based on the PIN code 401 and utilizes the SMP (Security Manager Protocol) of BLE to send the link key to the information processing apparatus 101. The information processing apparatus 101 stores, in the external storage device 106, the link key received from the communication apparatus 151. The communication apparatus 151 stores the created link key in the ROM 152. Note that in this embodiment, both the information processing apparatus 101 and the communication apparatus 151 store the same link key. However, the information processing apparatus 101 and the communication apparatus 151 may store different link keys as long as they are associated with each other. This completes pairing and after that, BLE communication between the information processing apparatus 101 and the communication apparatus 151 is permitted. After the completion of pairing, the communication apparatus 151 is notified of the stored link key when the information processing apparatus 101 requests the communication apparatus 151 for GATT communication (for example, in step S304 of FIG. 3). Then, the communication apparatus 151 compares the stored link key with the link key notified from the information processing apparatus 101 and confirms whether the apparatus has already been paired.

If the communication apparatus 151 can confirm that the apparatus has already been paired, it starts GATT communication with the information processing apparatus 101. Note that user input of the PIN code may be omitted by using a fixed PIN code. Further, after the completion of pairing, pairing may be canceled, and the link keys may be discarded if a predetermined time has elapsed. In this embodiment, pairing by the PIN code has been described. However, the present invention is not limited to this. For example, pairing may be executed without any PIN code. In this case, data in GATT communication may be encrypted. An encryption key can implement communication that can be decrypted only by a user capable of confirming the display unit (not shown) of the communication apparatus 151 by displaying or inputting the encryption key instead of the PIN code.

Figure 5A:
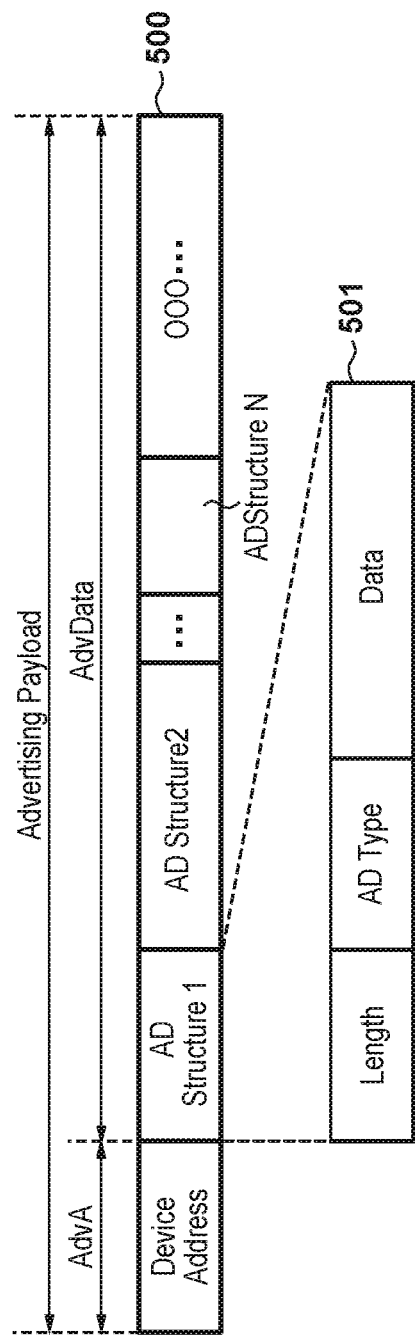

FIG. 5A is a table showing a payload portion of the advertising information. An advertising payload 500 is constituted by an advertising address (to be referred to as "AdvA") and advertising data (to be referred to as "AdvData"). In this embodiment, the advertising address is information uniquely applied to the communication apparatus 151. On the other hand, the advertising data further includes a plurality of advertising structure areas (to be referred to as "AD_Structure") and performs padding with "0" if a data value does not satisfy a predetermined capacity. An advertising structure area 501 is constituted by a data length (to be referred to as "Length"), advertising type (to be referred to as "AD Type"), and real data ("to be referred to as "Data") of the area.

FIG. 5B shows data 503 stored in the advertising structure area according to this embodiment. In the data 503, octet indicates the data length of each of constituent elements (Length, AD type, and Data) in an octet unit (1 octet means 8 bits). value indicates a data value. "0x" in value means that a value is a hexadecimal number. description describes a description of each data. In this embodiment, three advertising structure areas (to be referred to as "AD Structure1", "AD Structure2", and "AD Structure3") are stored. Three advertising structure areas in this embodiment store different data. AD_Structure) is a BLE data format, omitting a description thereof. Unique information of the communication apparatus 151 is stored in AD Structure2. Length indicates that the sum of AD Type in AD Structure2 and the data length in Data is 7 octets. AD Type indicates the meaning of information in Data. In an example of FIG. 5B, a value "0xFF" is defined as the unique information of the communication apparatus 151.

Data stores specific information, and information on a function and state (to be referred to as communication apparatus specific information). Information regarding a manufacturer of communication apparatuses or information for distinguishing communication apparatuses different in usage between, for example, home and office is given as a concrete example of the communication apparatus specific information. Data further stores the function and state of the communication apparatus. Information 504 on the function and state of the communication apparatus is stored in a byte array. In this embodiment, a value indicating whether the communication apparatus has a print function is set in the first octet. If the communication apparatus has the print function, value becomes "1". If the communication apparatus does not have the print function, value becomes "0". For example, the communication apparatus 151 includes the print engine 155, and thus value in the first octet becomes "1". If an error occurs in the communication apparatus 151, value in the second octet becomes "1". If an error state is not obtained, value becomes "0". For example, if ink of the communication apparatus runs out while printing in the print engine 155, the ink needs replacement, disabling printing or entering a print standby state until the ink is replaced. In this case, value in the second octet becomes "1". A page number is stored in the 16th octet. Note that in the example of FIG. 5B, although value in the 16th octet is "0", information on another octet is different if value in the 16th octet is "1". For example, the first octet indicates the presence/absence of the print function if the page number is "0", but the first octet can store other information if the page number is "1". It is possible to send the other information as well by changing the page number even if a size that can be stored in the advertising information is limited as described above.

Note that the contents and structure of the date stored in the advertising structure area are not limited to these. For example, a UUID (Universally Unique Identifier) serving as a number that can uniquely identify the combination of the device and state information of the communication apparatus and the manufacturer is defined in advance. Then, in accordance with the state or the like, the communication apparatus 151 may select the defined UUID and store it in the advertising structure area, executing advertising. In this embodiment, the UUID is replicated and defined by the combination, avoiding a match (collision phenomenon) with the UUID in the advertising information transmitted by another communication apparatus. If the collision phenomenon occurs, a malfunction occurs which is caused by processing the advertising information of the other communication apparatus by the information processing apparatus 101.

AD structure3 stores the name of the communication apparatus. The name of the communication apparatus is different for each apparatus, and thus the data length is variable. Length indicates that the sum of the AD Type in AD Structure3 and the data length in Data is 9 octets. AD Type indicates the meaning of information in Data. In the example of FIG. 5B, a value "0x09" is defined as the name of the communication apparatus 151. Data serves as the name of the communication apparatus. In the example of FIG. 5B, the name of the communication apparatus becomes "PrinterA".

The advertising information by the communication apparatus is sent periodically as described in FIG. 2B. Data contents of the advertising information change in accordance with the state of the communication apparatus as described above. Note that the present invention is not limited to periodically sending the advertising information. For example, an arrangement may be possible in which the advertising information is sent only if a specific condition is matched, such as when a user operation is performed via the input interface (not shown) of the communication apparatus 151.

A timing at which the pairing process is executed will be described below. In this embodiment, the pairing process is executed when changing the screen to the specific screen of the print application which provides the print execution function. First, an application screen will be described.

The information processing apparatus 101 receives an instruction from the user via the input interface 102 so as to activate the print application. The information processing apparatus 101 activates the print application. Note that a description will be given referring to the communication apparatus 151 as a printer having the print function hereinafter.

Figure 6A:
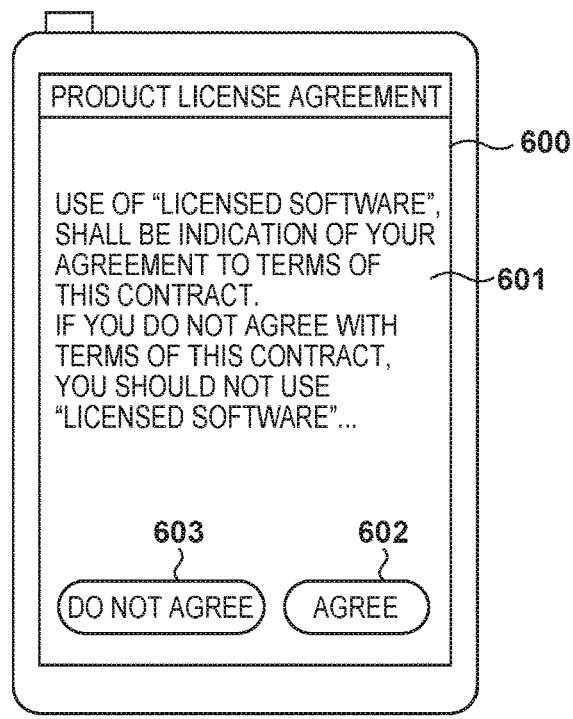
FIGS. 6A, 6B, 6C, 6D, 6E, and 6F are views showing an example of screen transition according to the present invention.

FIGS. 6A to 6F show screen transition of the print application displayed to the user via the display unit 108 of the information processing apparatus 101. A product license agreement screen 600 shown in FIG. 6A is a screen for confirming, for example, a condition to fulfill when the print application is used with the user. The user confirms the contents of product license agreement sentences 601 and selects whether to agree. If not agreeing, the user selects a button 603 to exit the print application. If agreeing, the user selects a button 602 to shift to a main screen 604 shown in FIG. 6B. Note that when the pairing process is not executed, the information processing apparatus 101 searches for the advertising information at a timing when a predetermined button is pressed in the print application. The predetermined button includes, for example, the display button of the remote UI in the print application as described above, or an image print button 605 or a document print button 606 in FIG. 6B. In addition, the predetermined button may be a print setting button 616 in FIG. 6D.

The main screen 604 displays a list of main functions of the print application. If a print target is image data stored in, for example, the external storage device 106 of the information processing apparatus 101, the user selects the image print button 605. When the image print button 605 is selected, a display screen changes to an image selection screen 613 shown in FIG. 6D. If the print target is document data, the user selects the document print button 606. When the document print button 606 is selected, the display screen changes to a document selection screen (not shown).

The print application can register, for example, specific information and function information of the printer in order to specify the printer in a wireless communication network. Note that for example, identification information (MAC address), the IP address, and the name of the printer can be given as information for specifying the printer. The function information of the printer can contain information such as information regarding performance or the like of the printer, for example, a printable paper type list and the presence/absence of a double-sided printing function. The print application performs a process of registering this specific information and the function information, storing these pieces of information in association with each other in the external storage device 106. A printer which has undergone such a registration process will be referred to as a "registered printer", and a printer which executes a print process will be referred to as a "current printer". Note that a plurality of printers can also be registered, though a description thereof will be omitted in this embodiment. In this case, the user selects the current printer out of the plurality of registered printers before executing the print process. Of course, if there is only one registered printer, that printer serves as the current printer.

Figure 6B:
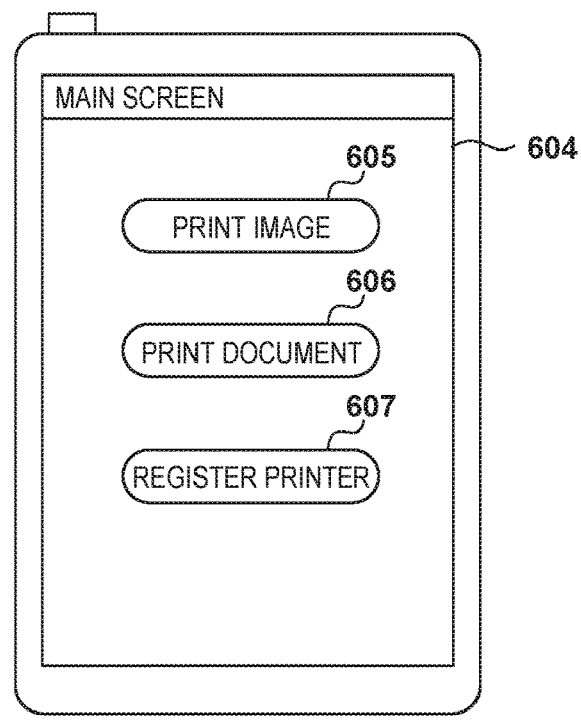
Figure 6C:
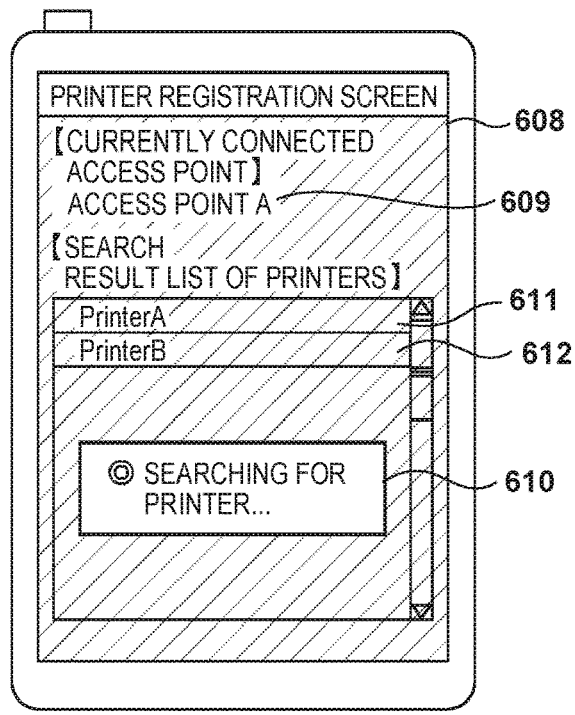

When registering the printer, the user selects a printer registration button 607 of the main screen 604 shown in FIG. 6B. When the printer registration button 607 is selected, the display screen changes to a printer registration screen 608 shown in FIG. 6C. When the display screen changes to the printer registration screen 608, the print application executes a process of searching for a printer connected into the wireless communication network. Then, the print application displays the found printer in a list form. The printer is displayed here with the name of the printer included in the specific information. The user selects a printer to register from a printer group listed on the printer registration screen 608, deciding the registered printer. The plurality of registered printers can also be selected.

On the printer registration screen 608, the SSID (Service Set Identifier) of the access point 131 currently being connected to the information processing apparatus is displayed as an access point name 609. It is referred to as "access point A" here for convenience. A dialog 610 displays the contents which specify an ongoing process on the screen. For example, while search processing is performed, the dialog 610 displays a message saying search-in-progress. While displaying the dialog 610, a state is set in which another area is blacked out and cannot be operated. After the end of search, the dialog 610 is hidden, and the other area is brightened, allowing a user operation such as the selection of another button to be performed. A result of searching for the printer is displayed in a search result list 611. In an example of FIG. 6C, two printers ("PrinterA" and "PrinterB" here) searched for are displayed. That is, "PrinterA" and "PrinterB" are being connected to access point A. When the user selects the listed printer and inputs a registration instruction, the print application registers the selected printer as the registered printer and shifts to the previous main screen 604. Note that in this embodiment, only one printer can serve as the registered printer, and the selected printer serves as the current printer. For example, if PrinterA 612 is selected, this serves as the current printer. If the plurality of printers are selected, the current printer may be decided according to a selected order.

Figure 6D:
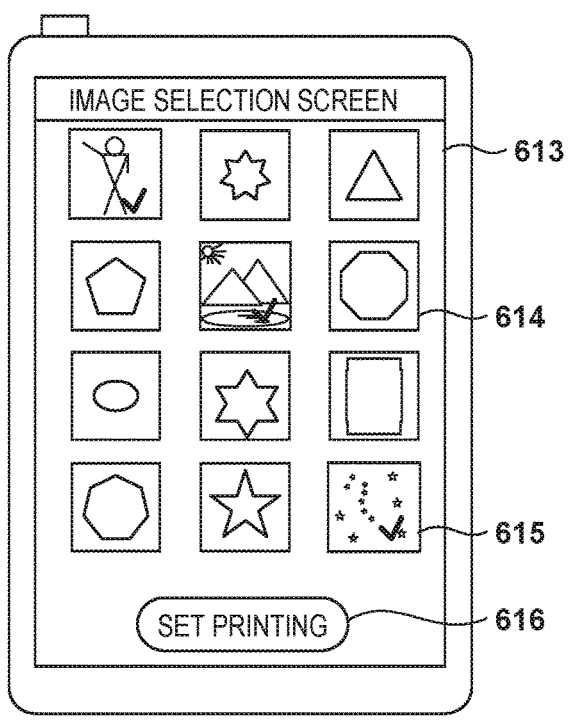
Figure 6E:
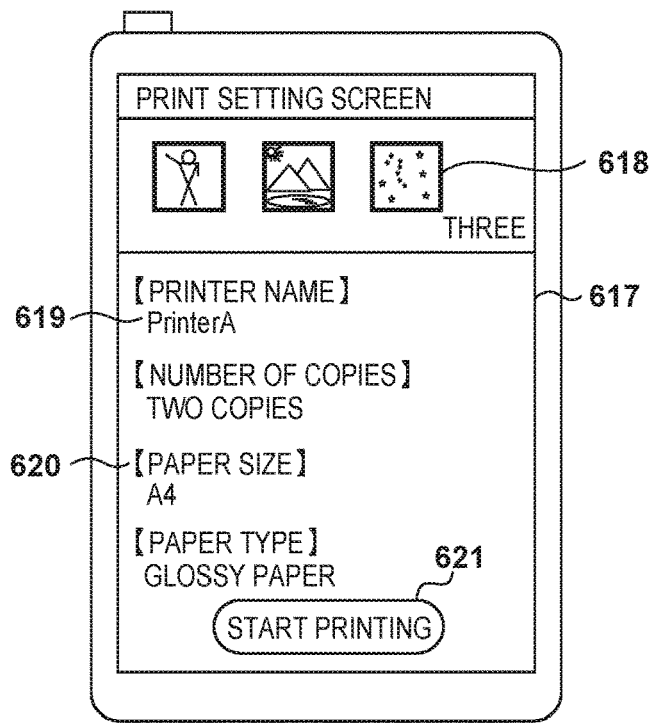
Figure 6F:
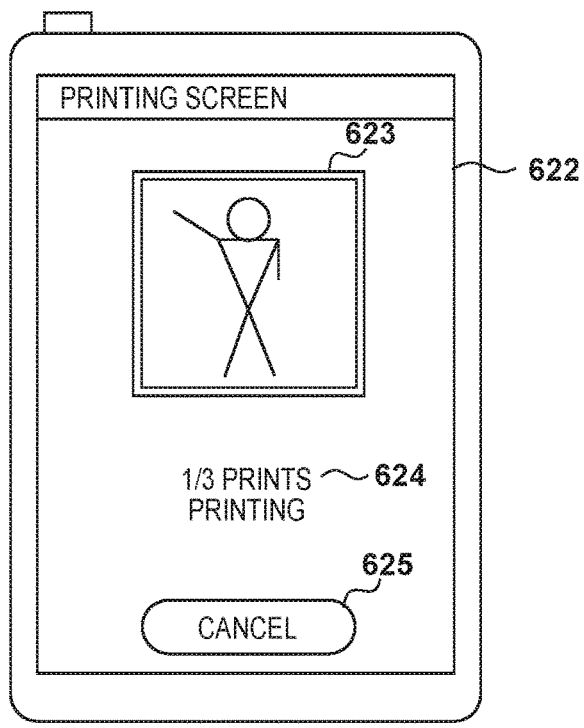

When the image print button 605 is selected on the main screen 604, the display screen changes to an image selection screen 613 shown in FIG. 6D. Thumbnail images of the image data stored in the external storage device 106 of the information processing apparatus 101 are displayed on the image selection screen 613, and the user can select print target images by selecting the thumbnail images. For the images selected as the print targets, check marks 615 indicating the print targets are displayed on thumbnails. If the user selects the images and selects a print setting button 616, the display screen changes to a print setting screen 617 shown in FIG. 6E.

The thumbnails of the print target images selected on the image selection screen 613 are displayed in a thumbnail display area 618 of the print setting screen 617. The printer name of the current printer is displayed in a printer name display area 619. A name which is included in the communication apparatus specific information stored in association with the current printer is displayed as the printer name. Note that if there are a plurality of registered printers, the name of the registered printer selected by the user via a printer selection screen (not shown) or the like is displayed as the current printer. Printing conditions when printing is executed is displayed in a printing condition display area 620. The user can change the printing conditions as needed on, for example, a print condition change screen (not shown). When instructing the print application to start printing, the user selects a print start button 621. Consequently, a print operation is started, and the screen changes to a printing screen 622 shown in FIG. 6F.

While the printing screen 622 is displayed, the print application sends, to the current printer (PrinterA here), an instruction to perform the print process on each print target image selected by the user on the printing conditions displayed in the printing condition display area. Out of the print target images, the image that is currently being printed by the printer is displayed as a printing image 623 on the printing screen 622. The progress and status of printing are displayed in a message 624. For example, if some problem occurs while printing, and printing cannot be continued or is ceased, those contents are displayed in the message 624 in order to inform the user of that state. If the user selects a cancel button 625, printing is ceased, and the display screen changes to the previous print setting screen 617. Note that when the cancel button 625 is selected, a message saying this or information on an image whose printing is completed/uncompleted may be displayed. Further, the display screen may change to the main screen 604.

FIG. 7 is a flowchart showing the pairing process executed by the print application. The information processing apparatus 101 executes this process immediately after the print application is activated. That is, the CPU 103 of the information processing apparatus 101 reads out and executes the programs stored in the ROM 104 or the like, thereby implementing this process. Note that the pairing process shown in FIG. 7 is started at the timing when the predetermined button is pressed in the print application as described above.

In step S700, the information processing apparatus 101 receives the advertising information transmitted by the printer and notifies the print application of reception. At this time, the advertising payload 500 stored in the advertising information is also passed to the print application. Note that if the information processing apparatus 101 receives the advertising information from a plurality of communication apparatuses, a selection screen for selecting a desired communication apparatus among the plurality of communication apparatuses is displayed. Then, the information processing apparatus 101 executes the subsequent pairing process with the communication apparatus selected via the selection screen.

When the print application receives the advertising information, in step S701, the information processing apparatus 101 confirms whether it is possible to execute pairing. A confirmation here will be described by using the screens of the print application in FIGS. 6A to 6F. In each screen, a state is obtained in which the print application causes the user to make a confirmation or in which some process is going on. In this case, pairing is not executed. More specifically, while the product license agreement screen 600 is displayed, permission to use the print application is not given until the product license agreement is agreed. Therefore, the pairing process is not executed even if the advertising information is received. In this embodiment, the printer registration screen 608 executes printer search processing at the time of screen transition, and thus if executing the pairing process as well while the dialog 610 of search-in-progress for the printer is displayed, a user operation is complicated by, for example, displaying a plurality of dialogs. Therefore, the pairing process is not executed while the dialog 610 is displayed. On the other hand, when the printer search processing is completed, and the dialog 610 is hidden, the information processing apparatus 101 determines that the pairing process can be executed. If the information processing apparatus 101 determines that pairing can be executed (YES in step S701), the process advances to step S702. If the information processing apparatus 101 determines that pairing cannot be executed (NO in step S701), this processing sequence ends. Note that if it is determined that pairing cannot be executed here, the information processing apparatus 101 may wait for a predetermined time and make a determination in step S701 again.

In step S702, the information processing apparatus 101 analyzes the received advertising information. The aforementioned data 503 stored in the advertising structure area is analyzed as the analysis of the advertising information.

In step S703, the information processing apparatus 101 determines, based on an analysis result of the advertising information, whether the print application receives processable specific advertising information. In this embodiment, the aforementioned communication apparatus specific information is used in this determination. As described above, the communication apparatus specific information stores the information indicating the manufacturer, or information indicating a function for home or office use. In a case in which the print application is an application complying with a home-use printer, the information processing apparatus 101 determines not to execute the pairing process if the communication apparatus specific information stores information that the printer is for office use. The information processing apparatus 101 determines to execute pairing if the communication apparatus specific information stores information that the printer is for home use.

Note that in this embodiment, the determination by the communication apparatus specific information has been described in determination processing here. However, the present invention is not limited to this. For example, the information processing apparatus 101 may determine that pairing is executed only for a printer with a specific name compatible with the print application depending on a communication apparatus name of the advertising information. Alternatively, the information processing apparatus 101 may determine to execute pairing depending on the information 504 on the function and state of the communication apparatus. For example, if the communication apparatus does not have the print function, the information processing apparatus 101 determines that pairing cannot be executed in the print application. If the printer is in the error state, and an application which deals with error information of the printer is installed on the information processing apparatus, the print application does not execute pairing. Then, the print application may guide the user to the application which deals with the error information. If the information processing apparatus 101 determines that the advertising information that the print application can deal with is received (YES in step S703), the process advances to step S704. If the information processing apparatus 101 determines that the advertising information that the print application cannot deal with is received (NO in step S703), this processing sequence ends.

In step S704, the information processing apparatus 101 obtains the list of communication apparatuses that have been paired in the past. Note that this information (list) is stored in the external storage device 106 or the like as a history when the information processing apparatus 101 performs pairing. The list here may also hold a history of a failure in pairing in addition to a history of the normal completion of pairing.

In step S705, the information processing apparatus 101 confirms whether pairing with the communication apparatus 151 that already has transmitted the advertising information has been completed. More specifically, the information processing apparatus 101 determines whether the list obtained in step S704 contains information on the communication apparatus serving as the analysis result in step S702, thereby implementing step S705. If the information processing apparatus 101 determines that pairing has not been completed yet (NO in step S705), the process advances to step S706. If the information processing apparatus 101 determines that pairing has already been completed (YES in step S705), this processing sequence ends. The information processing apparatus 101 confirms the completion of pairing in step S705, making it possible to omit unnecessary display and confirmation of a confirmation dialog 800 to be described later.

In step S706, the information processing apparatus 101 confirms whether the communication apparatus 151 transmitting the advertising information is the registered printer. If the information processing apparatus 101 determines that the communication apparatus 151 is the registered printer (YES in step S706), the process advances to step S708 without confirming execution of pairing. If the information processing apparatus 101 determines that the communication apparatus 151 is not the registered printer (NO in step S706), the process advances to step S707. The registered printer is a printer registered by the user as a printer to be utilized in the print application, and thus execution of pairing need not be confirmed. This configuration eliminates the need for performing an unnecessary execution confirmation, making it possible to reduce cumbersome user operation.

Figure 8:
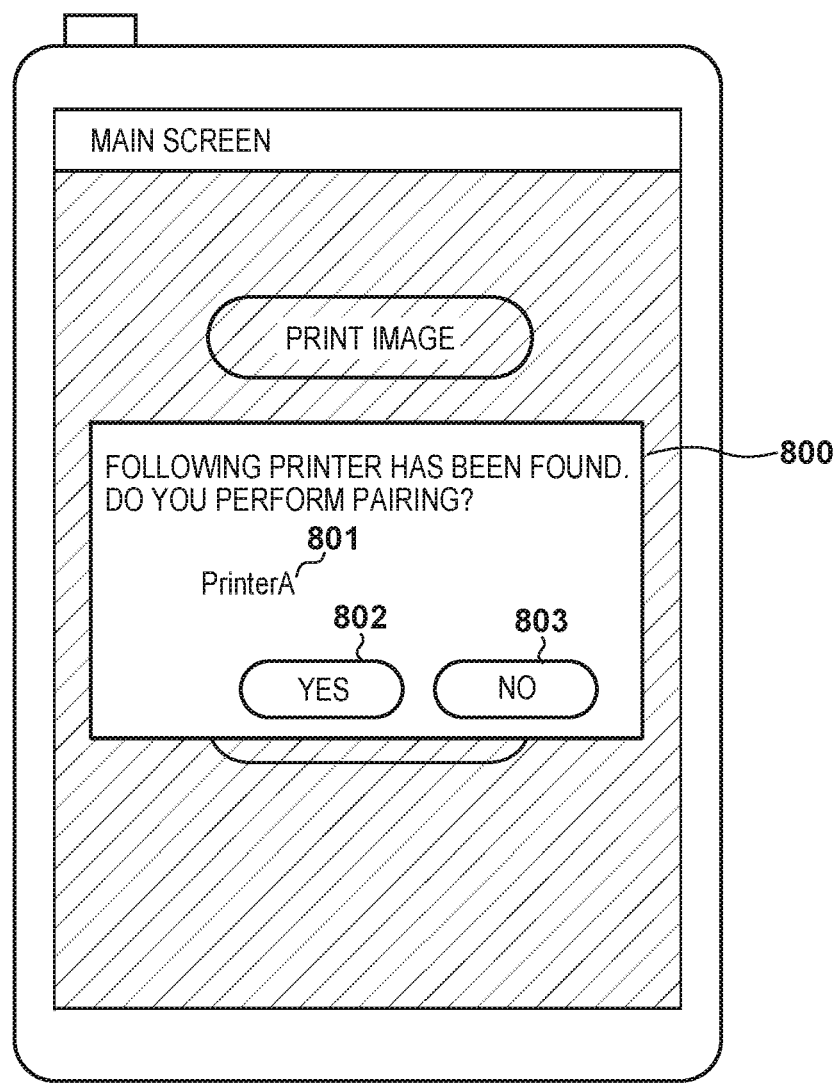
FIG. 8 is a view showing an example of a confirmation screen of pairing according to the present invention.

In step S707, the information processing apparatus 101 confirms, with the user, whether to execute pairing. Terminal apparatuses owned by an unspecified number of users receive the advertising of BLE due to its characteristics. Therefore, execution of pairing is confirmed for the purpose of confirming a printer is a printer owned or utilized by the user. When confirming execution, the information processing apparatus 101 displays the confirmation dialog 800 shown in FIG. 8 in the display unit 108. The confirmation dialog 800 displays a printer name 801 (PrinterA here). The user confirms the contents of the confirmation dialog 800 and confirms whether a pairing target is a desired printer. If the user selects a button 802, the information processing apparatus 101 determines to execute pairing (YES in step S707), and the process advances to step S708. On the other hand, if the user selects a button 803, the information processing apparatus 101 determines not to execute pairing (NO in step S707), and this processing sequence ends.

In step S708, the information processing apparatus 101 executes pairing. The process here corresponds to the contents that have been described with reference to FIGS. 4A and 4B. Then, this processing sequence ends.

(Handover Processing)

Processing (handover processing) from the start of Wi-Fi connection via GATT communication after pairing to sending of the print job will now be described with reference to FIG. 11.

FIG. 11 is a sequence chart in a case in which the information processing apparatus 101 and the communication apparatus 151 perform network connection by a BLE communication system. A case in which the print job is sent/received by handover will be described here as an example. Note that handover is a technique in which respective apparatuses which perform communication first use the short-range communication system to exchange connection information for performing communication by a high-speed communication system, and then switch over to the high-speed communication system to send/receive data. In this embodiment, BLE is used as the short-range communication system, and Wi-Fi® is used as the high-speed communication system.

The communication speed of GATT communication (two-way communication enabled by establishing BLE connection between the apparatuses) is slower than that of Wi-Fi communication. Accordingly, authentication between the apparatuses, an exchange of the connection information for Wi-Fi communication, and the like are performed in GATT communication, and data (the print job here) large in capacity is transferred in Wi-Fi communication having the high communication speed. This makes it possible to seek an efficient data transfer. Note that the communication system utilized in handover is not limited to the above-described form, but various communication systems may be utilized as the short-range communication system and the high-speed communication system. For example, an arrangement is also possible in which the connection information for Wi-Fi communication is exchanged in NFC communication or Wi-Fi Aware communication, and then data is exchanged in Wi-Fi communication.

Note that processing of the communication apparatus 151 shown by this processing sequence is implemented by causing the CPU 154 to load the control programs stored in the ROM 152 or an HDD (not shown) of the communication apparatus 151 into the RAM 153 and execute those control programs. Processing of the information processing apparatus 101 shown by this processing sequence is implemented by causing the CPU 103 to load the control programs stored in the ROM 104 or an HDD (not shown) of the information processing apparatus 101 into the RAM 105 and execute those control programs.

In a description below, the communication apparatus 151 serves as an advertiser which sends the advertising information at predetermined intervals. The information processing apparatus 101 serves as a scanner which waits for the advertising information sent from the peripheral advertiser. First, the short-range wireless communication unit 157 sends the advertising information (steps S1101 to S1103). As described above, the advertising information is sent here at preset advertising intervals.

When the image print button 605 and the document print button 606 in the print application are pressed, the short-range wireless communication unit 110 of the information processing apparatus 101 starts searching for the advertising information sent from the short-range wireless communication unit 157. This makes it possible to recognize the existence of the communication apparatus 151. Note that search for the advertising information may be started at the other timing as described above. It may be started, for example, at a timing when the images are selected in FIG. 6D. If pairing is not completed before the start of processing in FIG. 11, the above-described pairing process is executed at this timing.

In step S1104, the information processing apparatus 101 recognizes the communication apparatus 151, decides to be connected to the communication apparatus 151, and then sends connection request information to the communication apparatus 151. More specifically, the information processing apparatus 101 displays, for example, the name of the communication apparatus 151 included in the advertising information and inquires of the user whether to start connection. If the user instructs to start connection with the communication apparatus 151 here, the short-range wireless communication unit 110 sends CONNECT_REQ serving as a request for shifting to a connection event that establishes network connection by BLE.

When the short-range wireless communication unit 157 of the communication apparatus 151 receives CONNECT_REQ, the information processing apparatus 101 and the communication apparatus 151 prepare to shift to the connection event. More specifically, the short-range wireless communication unit 110 and the short-range wireless communication unit 157, respectively, notify the CPU 103 and the CPU 154 of the completion of connection processing for GATT communication. Then, the information processing apparatus 101 and the communication apparatus 151, respectively, change from the scanner and the advertiser to a master and a slave, and the information processing apparatus 101 serving as the master and the communication apparatus 151 serving as the slave establish connection (BLE connection) for GATT communication. Note that in the BLE standard, the master can form a star topology at the ratio of 1 to many with the slave. After establishing BLE connection, the information processing apparatus 101 and the communication apparatus 151 can subsequently perform data communication by a GATT communication system.

After BLE connection is established, in step S1105, the short-range wireless communication unit 110 requests the short-range wireless communication unit 157 for information on a communication protocol available to the communication apparatus 151. This request contains information on a communication protocol available to the information processing apparatus 101, and the short-range wireless communication unit 157 can recognize, by receiving this request, that the information processing apparatus 101 can utilize the communication system such as Wi-Fi®. In step S1106, the short-range wireless communication unit 157 responds to the request received in step S1105 with the information on the communication protocol available to itself. This allows the respective apparatuses to grasp the communication protocols other than BLE available to each of them.

By grasping the communication protocols other than BLE available to each of them, the information processing apparatus 101 decides to switch communication between the apparatuses to Wi-Fi communication. Note that at this time, the communication apparatus 151 may decide whether to switch the communication system. If the information processing apparatus 101 decides to switch the communication system, in steps S1107 and S1108, the respective apparatuses exchange communication information needed to perform Wi-Fi communication such as SSID information or address information which specifies their communication partners.

In step S1109, the short-range wireless communication unit 110 of the information processing apparatus 101 sends a request (communication switching request) to switch the communication system between the apparatuses from GATT communication to Wi-Fi communication. Upon receiving the switching request, the short-range wireless communication unit 157 of the communication apparatus 151 makes a response in step S1110.

If the switching request and the response are made properly, in step S1111, the information processing apparatus 101 switches the communication unit to be utilized for communication with the communication apparatus 151 from the short-range wireless communication unit 110 to the communication unit 109. Likewise, if the switching request and the response are made properly, in step S1112, the communication apparatus 151 switches the communication unit to be utilized for communication with the information processing apparatus 101 from the short-range wireless communication unit 157 to the communication unit 156.

After the communication unit is switched, in step S1113, the short-range wireless communication unit 110 of the information processing apparatus 101 sends a release request in step S1113. Upon receiving the release request, in step S1114, the short-range wireless communication unit 157 sends a release response and terminates BLE connection (GATT communication) between the apparatuses. After BLE connection between the apparatuses is terminated, the information processing apparatus 101 and the communication apparatus 151, respectively, return to the scanner and the advertiser, and the short-range wireless communication unit 157 resumes sending the advertising information.

Then, the respective apparatuses utilize the information needed to perform Wi-Fi communication exchanged in steps S1107 and S1108 to perform Wi-Fi communication. First, in step S1115, the communication unit 109 confirms whether it is possible for the communication apparatus 151 to obtain the print job with the communication unit 156. For example, information on a free capacity for temporarily storing an image to be transferred to the communication apparatus 151 or the like is confirmed here. Upon receiving a confirmation request, the communication unit 156 sends a response to the confirmation in step S1116.

If the proper response is obtained, and it is judged that the communication apparatus 151 can obtain the job, the communication unit 156 requests the information processing apparatus 101 for the job in step S1117. Then, the communication unit 109 that has received a job request sends a print job containing, for example, image data present in the information processing apparatus 101 to the communication unit 156 in step S1118. Note that the print job sent at this time is selected, for example, at a timing such as before or after BLE connection is established, or after Wi-Fi connection is established.

The job sent is not limited to the print job but may be, for example, a scan job for instructing the communication apparatus 151 to scan, a job for the information processing apparatus 101 to obtain information on the state of the communication apparatus 151, or the like. Alternatively, the job may be, for example, a command or the like for executing various operations for the communication apparatus 151 such as a change of the setting of the communication apparatus 151.

When job sending is completed, the information processing apparatus 101 disconnects Wi-Fi connection with the communication apparatus 151 and returns to a network state immediately before handover. More specifically, for example, when connected to a mobile telecommunications network such as 3G or LTE, or an access point such as a router before handover is executed, the information processing apparatus 101 establishes connection to the mobile telecommunications network or the access point again. To do this, the information processing apparatus 101 holds information on the network state immediately before handover, communication information needed to establish the network information or the like before handover is executed.

By using a handover technique as described above, it is possible, by a communication system (short-range communication system) with a high degree of usability, to exchange the connection information to communicate by the high-speed communication system, and then to exchange data large in capacity at high speed by the high-speed communication system. Note that if the communication system is switched from GATT communication to Wi-Fi communication by handover, BLE connection between the apparatuses is disconnected. Therefore, the short-range wireless communication unit 157 resumes sending the advertising information.

Note that in this embodiment, a description has been given such that the pairing process (and determination processing of whether to perform the pairing process) is executed immediately after the print application is activated. However, the present invention is not limited to this. For example, the pairing process may be executed at the time of screen transition of the print application or when a specific operation in the screen is executed.

Second Embodiment

A method of obtaining the password for utilizing the function with the access restriction in advance by GATT communication of BLE and utilizing the function without inputting the password individually in order to access the function has been described in the first embodiment. If this password can be obtained without any restriction, however, the function with the access restriction can be used easily. Therefore, in the first embodiment, a target capable of obtaining the password is limited by inputting the PIN code by pairing.

In this embodiment, a mode in which it is possible to use a function with an access restriction by a method different from a PIN code will be described with reference to FIGS. 9 and 10. Note that a description of an arrangement overlapping with that in the first embodiment will be omitted.

Also in this embodiment, a description will be given by taking a remote UI as an example as a function provided by a communication apparatus 151. However, the present invention is not limited to this.

[Processing Sequence]

FIG. 9 shows a process performed before the remote UI is displayed. This process is a sequence in which the MAC address of an information processing apparatus 101 is registered in the communication apparatus 151 at a timing when the information processing apparatus 101 and the communication apparatus 151 can communicate with each other by BLE. Note that respective processes according to the processing sequence below are based on the hardware arrangement shown in FIG. 1, and implemented by causing CPUs included in the information processing apparatus 101 and the communication apparatus 151, respectively, to read out and execute programs stored in ROMs or the like. Further, communication between the apparatuses is performed via short-range wireless communication units of the respective apparatuses.

In step S901, the information processing apparatus 101 receives advertising information transmitted from the communication apparatus 151. Note that a range in which reception of the advertising information of BLE is possible is limited to a predetermined range. Therefore, a user carrying the information processing apparatus 101 needs to approach the communication apparatus 151 to fall within that range when receiving the advertising information of BLE.

In step S902, the information processing apparatus 101 executes a pairing process. The pairing process is the same as the process described in the first embodiment.

After pairing is terminated in step S902, in step S903, the information processing apparatus 101 requests the communication apparatus 151 for GATT communication in a BLE standard, and GATT communication is performed subsequently. Note that the arrangement of a profile used for GATT communication is not particularly limited, and a description thereof will be omitted here.

In step S904, the information processing apparatus 101 obtains its own MAC address. The MAC address is managed in the information processing apparatus 101.

In step S905, the information processing apparatus 101 sends, by GATT communication, the MAC address obtained in step S904 to the communication apparatus 151.

In step S906, the communication apparatus 151 stores the MAC address received from the information processing apparatus 101. For example, a storage area (a RAM 153 or the like) of the communication apparatus 151 corresponds to a storage destination here.

In step S907, the communication apparatus 151 notifies, by GATT communication, the information processing apparatus 101 of a result of storage processing of the MAC address. At this time, if the result of storage processing indicates an error, the information processing apparatus 101 may retry sending the MAC address or notify the user of a failure.

With the process of FIG. 9, the communication apparatus 151 can hold the MAC address of the information processing apparatus 101 before the information processing apparatus 101 displays the remote UI.

FIG. 10 shows a sequence in which the function (the remote UI of a printer) on which the access restriction is imposed is executed after execution of the process in FIG. 9. Note that respective processes according to the processing sequence below are based on the hardware arrangement shown in FIG. 1, and implemented by causing the CPUs included in the information processing apparatus 101 and the communication apparatus 151, respectively, to read out and execute the programs stored in the ROMs or the like. Further, communication between the apparatuses is performed via the short-range wireless communication units of the respective apparatuses.

In step S1001, if an instruction to display the remote UI is input in a print application, the information processing apparatus 101 prepares to receive the advertising information of BLE from the communication apparatus 151.

In step S1002, the information processing apparatus 101 receives the advertising information transmitted from the communication apparatus 151.

Upon receiving the advertising information, in step S1003, the information processing apparatus 101 requests the communication apparatus 151 for GATT communication, and GATT communication is started.

In step S1004, the information processing apparatus 101 obtains its own MAC address.

In step S1005, the information processing apparatus 101 sends, by GATT communication, the MAC address obtained in step S1004 to the communication apparatus 151.

In step S1006, the communication apparatus 151 determines whether the MAC address received from the information processing apparatus 101 in step S1005 has been registered yet. A determination here is made based on the MAC address stored by the process of FIG. 9.

In step S1007, the communication apparatus 151 sends, by GATT communication, a determination result in step S1006 to the information processing apparatus 101. As the determination result sent here, a response that access of the remote UI is permitted as authentication success if the MAC address is registered is made, and the value of an error (authentication failure) is returned if the MAC address is not registered. Note that if access is permitted, the communication apparatus 151 may also send information regarding the remote UI.

In step S1008, the information processing apparatus 101 determines, based on contents received from the communication apparatus 151 in step S1007, whether the response that access is permitted is obtained. If access is permitted (YES in step S1008), the process advances to step S1010. If the error is returned (NO in step S1008), the process advances to step S1009.

In step S1009, the information processing apparatus 101 displays the error in a display unit 108 and waits until the next process arrives.

In step S1010, the information processing apparatus 101 displays the remote UI. Note that the screen arrangement of the remote UI is not particularly limited, and thus a description thereof will be omitted here.

As described above, in this embodiment, the MAC address of the information processing apparatus reliable in prior BLE communication is registered in the communication apparatus in order to access the function (the remote UI here) with the access restriction. This makes it possible to use the function with the access restriction without needing any password when the function with the access restriction is used actually. As a result, user convenience improves.

Note that in this embodiment, an example has been described in which the MAC address serving as identification information unique to a network device is used. However, the present invention is not limited to this. Other information may be used as long as it can uniquely identify the information processing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-069280, filed Mar. 30, 2016, which is hereby incorporated by reference herein in its entirety.

What is claimed is:

1. An information processing apparatus which comprises a short range wireless communication interface for performing first and second communication with a printing apparatus configured to provide a remote user interface (UI) function of managing the printing apparatus by using a Web browser of the information processing apparatus, comprising:
 a processor; and
 a memory containing instructions that, when executed by the processor, cause the processor to perform operations comprising:
 causing a display to display a password input screen for using the remote UI function;
 performing a first authentication processing to enable the short range wireless communication interface to perform the second communication based on an advertise packet transmitted from the printing apparatus being received in the first communication, wherein the first communication is performed using the short range wireless communication interface before the first authentication processing and the second communication is performed using the short range wireless communication interface after the first authentication processing;
 receiving password information of the remote UI function from the printing apparatus via the second communication using the short range wireless communication interface;
 sending the received password information of the remote UI function to the printing apparatus; and if it is determined, by the printing apparatus, that the sent password information of the remote UI function is valid, displaying a screen corresponding to the remote UI function based on information about the screen of the remote UI function, without displaying the password input screen, wherein, a second authentication processing is performed using a password which is input using the password input screen displayed by the display of the information processing apparatus, wherein in a case that the second authentication processing is successful, a screen corresponding to the remote UI function based on the information about the screen of the remote UI function is displayed by the display of the information processing apparatus, and wherein the screen corresponding to the remote UI function displayed based on the first authentication processing being performed is the same as the screen corresponding to the remote UI function displayed based on success of the second authentication processing.

2. The apparatus according to claim 1, the memory further having stored thereon instructions that, when executed by the processor, cause the processor:
determining whether it is possible to obtain, from the printing apparatus, authentication information needed when the remote UI function is utilized; and
obtaining the authentication information via the short range wireless communication interface if it is determined that it is possible to obtain the authentication information,
wherein the second authentication processing is performed using the obtained authentication information.

3. The apparatus according to claim 2, wherein the password input screen is displayed if it is determined that it is impossible to obtain the authentication information.

4. The apparatus according to claim 1, wherein if authentication information output by the printing apparatus is input to a screen for the first authentication processing displayed by the information processing apparatus, the first authentication processing is performed.

5. The apparatus according to claim 1, wherein the short range wireless communication interface performs wireless communication using BLE (Bluetooth Low Energy).

6. The apparatus according to claim 5, wherein the information obtained from the printing apparatus is an advertising packet issued by the printing apparatus.

7. The apparatus according to claim 1, wherein the first communication is advertising communication, and the second communication is a GATT communication.

8. The apparatus according to claim 1, wherein the screen corresponding to the remote UI function includes information about a status of the printing apparatus.

9. The apparatus according to claim 1, wherein the screen corresponding to the remote UI function includes information about a recording material of the printing apparatus.

10. A method of controlling an information processing apparatus which comprises a short range wireless communication interface for performing first and second communication with a printing apparatus configured to provide a remote user interface (UI) function of managing the printing apparatus by using a Web browser of the information processing apparatus, the method comprising:
causing a display to display a password input screen for using the remote UI function;
performing a first authentication processing to enable the short range wireless communication interface to perform the second communication based on an advertise packet transmitted from the printing apparatus being received in the first communication, wherein the first communication is performed using the short range wireless communication interface before the first authentication processing and the second communication is performed using the short range wireless communication interface after the first authentication processing;
receiving password information of the remote UI function from the printing apparatus via the second communication using the short range wireless communication interface;
sending the received password information of the remote UI function to the printing apparatus; and
if it is determined, by the printing apparatus, that the sent password information of the remote UI function is valid, displaying a screen corresponding to the remote UI function based on information about the screen of the remote UI function, without displaying the password input screen.

11. The method according to claim 10, further comprising determining whether it is possible to obtain, from the printing apparatus, authentication information needed when the remote UI function is utilized; and
obtaining the authentication information via the short range wireless communication interface if it is determined that it is possible to obtain the authentication information,
wherein the second authentication processing is performed using the obtained authentication information.

12. The method according to claim 11, wherein the password input screen is displayed if it is determined that it is impossible to obtain the authentication information.

13. The method according to claim 10, wherein if authentication information output by the printing apparatus is input to a screen for the first authentication processing displayed by the information processing apparatus, the first authentication processing is performed.

14. The method according to claim 10, wherein the short range wireless communication interface performs wireless communication using BLE (Bluetooth Low Energy).

15. The method according to claim 14, wherein the information obtained from the printing apparatus is an advertising packet issued by the printing apparatus.

16. The method according to claim 10, wherein the first communication is advertising communication, and the second communication is a GATT communication.

17. The method according to claim 10, wherein the screen corresponding to the remote UI function includes information about a status of the printing apparatus.

18. The method according to claim 10, wherein the screen corresponding to the remote UI function includes information about a recording material of the printing apparatus.

19. A non-transitory computer-readable medium storing a program to cause a computer, comprising a short range wireless communication interface for performing first and second communication with a printing apparatus configured to provide a remote user interface (UI) function of managing the printing apparatus by using a Web browser of the information processing apparatus, to perform a method, the method comprising:
causing a display to display a password input screen for using the remote UI function;
performing a first authentication processing to enable the short range wireless communication interface to perform the second communication based on an advertise packet transmitted from the printing apparatus being received in the first communication, wherein the first communication is performed using the short range wireless communication interface before the first authentication processing and the second communication is performed using the short range wireless communication interface after the first authentication processing;

receiving password information of the remote UI function from the printing apparatus via the second communication using the short range wireless communication interface;

sending the received password information of the remote UI function to the printing apparatus; and if it is determined, by the printing apparatus, that the sent password information of the remote UI function is valid, displaying a screen corresponding to the remote UI function based on information about the screen of the remote UI function, without displaying the password input screen.

* * * * *